United States Patent
Sloan et al.

(10) Patent No.: US 7,831,494 B2
(45) Date of Patent: Nov. 9, 2010

(54) AUTOMATED FINANCIAL PORTFOLIO COACHING AND RISK MANAGEMENT SYSTEM

(75) Inventors: Ronald E. Sloan, Toronto (CA);
Stephen B. Slutsky, Toronto (CA)

(73) Assignee: Accenture Global Services GmbH, Schaffhausen (CH)

( * ) Notice: Subject to any disclaimer, the term of this patent is extended or adjusted under 35 U.S.C. 154(b) by 704 days.

(21) Appl. No.: 09/930,786

(22) Filed: Aug. 15, 2001

(65) Prior Publication Data

US 2002/0147671 A1    Oct. 10, 2002

Related U.S. Application Data

(63) Continuation of application No. 09/705,287, filed on Nov. 1, 2000, now abandoned, and a continuation-in-part of application No. 09/580,352, filed on May 25, 2000, now abandoned, and a continuation-in-part of application No. 09/431,390, filed on Nov. 1, 1999, now abandoned.

(51) Int. Cl.
*G06Q 40/00* (2006.01)

(52) U.S. Cl. ............................ 705/36 R; 705/35; 705/37

(58) Field of Classification Search .................. 705/35, 705/36, 36 R, 37
See application file for complete search history.

(56) References Cited

U.S. PATENT DOCUMENTS

| | | | |
|---|---|---|---|
| 4,455,609 A | 6/1984 | Inamura et al. | |
| 4,597,046 A | 6/1986 | Musmanno et al. | |
| 4,822,647 A | 4/1989 | Nozaki et al. | |
| 4,896,291 A | 1/1990 | Gest et al. | |

(Continued)

FOREIGN PATENT DOCUMENTS

GB    2 192 567 A    1/1988

(Continued)

OTHER PUBLICATIONS

Starr, Barry, U.S. Appl. No. 60/107,731, filed Nov. 9, 1998.*

(Continued)

*Primary Examiner*—Nga B. Nguyen
(74) *Attorney, Agent, or Firm*—Finnegan, Henderson, Farabow, Garrett, Dunner LLP

(57) ABSTRACT

The present invention relates to an Internet enabled, interactive financial portfolio risk modeling system. The system operates online, in a collaborative computing environment between the user and the portfolio development system. The portfolio generating system models the user's personal investment parameters into a user profile in terms of the user risk tolerance level, user investment style and user bull/bear attitude. The system further calculates Value At Risk (VAR) values for the user. The system filters various securities based on their VAR and Beta values and present two list of filtered securities, with opposing Beta values, matching the user profile. The present invention enables the user to swap securities in and out of his existing portfolio and receive an analysis of the effect of the swap on his portfolio. The model also generates an ideal portfolio based on the user profile. The present invention presents the user with an estimated value of his portfolio, based on a regression formula as well as a possible best and worst scenario based on statistical formulas particularly to computer implemented, Internet based financial modeling systems.

42 Claims, 17 Drawing Sheets

U.S. PATENT DOCUMENTS

| | | | |
|---|---|---|---|
| 4,953,085 A | 8/1990 | Atkins | |
| 5,077,665 A | 12/1991 | Silverman et al. | |
| 5,126,936 A | 6/1992 | Champion et al. | |
| 5,132,899 A | 7/1992 | Fox | |
| 5,136,501 A | 8/1992 | Silverman et al. | |
| 5,161,103 A | 11/1992 | Kosaka et al. | |
| 5,185,696 A | 2/1993 | Yoshino et al. | |
| 5,193,056 A | 3/1993 | Boes | |
| 5,214,579 A | 5/1993 | Wolfberg et al. | |
| 5,222,019 A | 6/1993 | Yoshino et al. | |
| 5,481,476 A | 1/1996 | Windig | |
| 5,615,109 A | 3/1997 | Eder | |
| 5,729,700 A | 3/1998 | Melnikoff | |
| 5,745,885 A | 4/1998 | Mottola et al. | |
| 5,761,442 A | 6/1998 | Barr et al. | |
| 5,774,663 A | 6/1998 | Randle et al. | |
| 5,774,878 A | 6/1998 | Marshall | |
| 5,774,880 A | 6/1998 | Ginsberg | |
| 5,774,883 A | 6/1998 | Andersen et al. | |
| 5,784,696 A | 7/1998 | Melnikoff | |
| 5,799,287 A | 8/1998 | Dembo | |
| 5,806,048 A | 9/1998 | Kiron et al. | |
| 5,806,049 A | 9/1998 | Petruzzi | |
| 5,809,484 A | 9/1998 | Mottola et al. | |
| 5,811,055 A | 9/1998 | Geiger | |
| 5,812,988 A | 9/1998 | Sandretto | |
| 5,819,237 A | 10/1998 | Garmin | |
| 5,819,238 A | 10/1998 | Bromley et al. | |
| 5,826,250 A | 10/1998 | Trefler | |
| 5,852,811 A | 12/1998 | Atkins | |
| 5,857,176 A | 1/1999 | Ginsberg | |
| 5,864,828 A | 1/1999 | Atkins | |
| 5,870,550 A | 2/1999 | Wesinger, Jr. | |
| 5,873,071 A | 2/1999 | Ferstenberg et al. | |
| 5,875,437 A | 2/1999 | Atkins | |
| 5,884,287 A | 3/1999 | Edesess | |
| 5,893,079 A | 4/1999 | Cwenar | |
| 5,903,879 A | 5/1999 | Mitchell | |
| 5,911,135 A | 6/1999 | Atkins | |
| 5,911,136 A | 6/1999 | Atkins | |
| 5,913,202 A | 6/1999 | Motoyama | |
| 5,918,217 A * | 6/1999 | Maggioncalda et al. | 705/36 |
| 5,920,848 A | 7/1999 | Schutzer et al. | |
| 5,930,762 A | 7/1999 | Masch | |
| 5,930,774 A | 7/1999 | Chennault | |
| 5,940,812 A | 8/1999 | Tengel et al. | |
| 5,950,176 A | 9/1999 | Keiser et al. | |
| 5,963,625 A | 10/1999 | Kawecki | |
| 5,963,925 A | 10/1999 | Kolling et al. | |
| 5,970,478 A | 10/1999 | Walker et al. | |
| 5,978,778 A | 11/1999 | O'Shaughnessy | |
| 5,987,433 A | 11/1999 | Crapo | |
| 5,987,434 A | 11/1999 | Libman | |
| 5,987,436 A | 11/1999 | Halbrook | |
| 5,999,918 A | 12/1999 | Williams et al. | |
| 6,003,018 A | 12/1999 | Michaud et al. | |
| 6,006,201 A | 12/1999 | Berent et al. | |
| 6,012,042 A | 1/2000 | Black et al. | |
| 6,012,043 A | 1/2000 | Albright et al. | |
| 6,012,044 A * | 1/2000 | Maggioncalda et al. | 705/36 |
| 6,018,722 A | 1/2000 | Ray et al. | |
| 6,018,768 A | 1/2000 | Ullman et al. | |
| 6,021,397 A * | 2/2000 | Jones et al. | 705/36 |
| 6,026,382 A | 2/2000 | Kalthoff | |
| 6,029,153 A | 2/2000 | Bauchner et al. | |
| 6,055,514 A | 4/2000 | Wren | |
| 6,055,517 A | 4/2000 | Friend | |
| 6,058,378 A | 5/2000 | Clark et al. | |
| 6,064,984 A | 5/2000 | Ferguson et al. | |
| 6,064,986 A | 5/2000 | Edelman | |
| 6,069,628 A | 5/2000 | Farry | |
| 6,078,904 A * | 6/2000 | Rebane | 705/36 |
| 6,081,768 A | 6/2000 | Hu | |
| 6,085,175 A | 7/2000 | Gugel et al. | |
| 6,112,181 A | 8/2000 | Shear et al. | |
| 6,119,103 A | 9/2000 | Basch et al. | |
| 6,125,355 A | 9/2000 | Bekaert et al. | |
| 6,151,582 A | 11/2000 | Huang et al. | |
| 6,186,793 B1 | 2/2001 | Brubaker | |
| 6,195,697 B1 | 2/2001 | Bowman-Amuah | |
| 6,230,197 B1 | 5/2001 | Beck et al. | |
| 6,233,566 B1 | 5/2001 | Levine et al. | |
| 6,236,972 B1 | 5/2001 | Shkedy | |
| 6,236,975 B1 | 5/2001 | Boe et al. | |
| 6,253,192 B1 | 6/2001 | Corlett et al. | |
| 6,256,773 B1 | 7/2001 | Bowman-Amuah | |
| 6,272,528 B1 | 8/2001 | Cullen et al. | |
| 6,275,807 B1 | 8/2001 | Schirripa | |
| 6,275,814 B1 | 8/2001 | Giansante et al. | |
| 6,282,520 B1 | 8/2001 | Schirripa | |
| 6,292,787 B1 * | 9/2001 | Scott et al. | 705/36 |
| 6,292,827 B1 | 9/2001 | Raz | |
| 6,307,958 B1 | 10/2001 | Deaton et al. | |
| 6,317,726 B1 | 11/2001 | O'Shaughnessy | |
| 6,324,523 B1 | 11/2001 | Killeen, Jr. | |
| 6,327,586 B1 | 12/2001 | Kisiel | |
| 6,332,154 B2 | 12/2001 | Beck et al. | |
| 6,336,102 B1 | 1/2002 | Luskin et al. | |
| 6,349,290 B1 | 2/2002 | Horowitz et al. | |
| 6,360,210 B1 | 3/2002 | Wallman | |
| 6,370,355 B1 | 4/2002 | Ceretta et al. | |
| 6,370,508 B2 | 4/2002 | Beck et al. | |
| 6,375,466 B1 | 4/2002 | Juranovic | |
| 6,388,688 B1 | 5/2002 | Schileru-Key | |
| 6,393,409 B2 | 5/2002 | Young et al. | |
| 6,393,412 B1 * | 5/2002 | Deep | 705/400 |
| 6,405,179 B1 | 6/2002 | Rebane | |
| 6,408,225 B1 | 6/2002 | Ortmeier et al. | |
| 6,418,417 B1 | 7/2002 | Corby et al. | |
| 6,430,542 B1 * | 8/2002 | Moran | 705/36 |
| 6,470,325 B1 | 10/2002 | Leemhuis | |
| 6,477,447 B1 | 11/2002 | Lin | |
| 6,513,069 B1 | 1/2003 | Abato et al. | |
| 6,539,419 B2 | 3/2003 | Beck et al. | |
| 6,564,191 B1 | 5/2003 | Reddy | |
| 6,567,796 B1 | 5/2003 | Yost et al. | |
| 6,574,600 B1 | 6/2003 | Fishman et al. | |
| 6,601,044 B1 * | 7/2003 | Wallman | 705/36 |
| 6,606,606 B2 * | 8/2003 | Starr | 705/36 R |
| 6,615,240 B1 | 9/2003 | Sullivan | |
| 7,231,608 B1 | 6/2007 | Fano et al. | |
| 7,315,837 B2 | 1/2008 | Sloan et al. | |
| 7,401,040 B2 | 7/2008 | Sloan et al. | |
| 2001/0032207 A1 | 10/2001 | Harley et al. | |
| 2001/0039493 A1 | 11/2001 | Pustejovsky et al. | |
| 2001/0044739 A1 | 11/2001 | Bensemana | |
| 2002/0046074 A1 | 4/2002 | Barton | |
| 2002/0087496 A1 | 7/2002 | Stirpe et al. | |
| 2002/0095363 A1 | 7/2002 | Sloan et al. | |
| 2002/0099613 A1 | 7/2002 | Swart et al. | |
| 2002/0161928 A1 | 10/2002 | Ndili | |
| 2003/0144936 A1 | 7/2003 | Sloan et al. | |

FOREIGN PATENT DOCUMENTS

| | | |
|---|---|---|
| JP | 408086190 A | 4/1996 |
| JP | 100-93729 | 9/1996 |
| JP | 410093729 A | 9/1996 |
| JP | 411110447 A | 4/1999 |
| JP | 2000163030 A | 6/2000 |
| JP | 2000355290 A | 12/2000 |
| JP | 2001-209721 | 8/2001 |
| WO | WO 98/14902 A1 | 4/1998 |
| WO | WO 98/38558 A2 | 9/1998 |

| | | |
|---|---|---|
| WO | WO 01/22253 A2 | 3/2001 |
| WO | WO0137187 | 5/2001 |

OTHER PUBLICATIONS

"Personal financial software", The CPA Journal, New York, Sep. 1999, vol. 69, Iss.9; p. 40, 7 pgs, Proquest, describes numbers of software packages on the market for providing automated coaching for a financial modeling.

"Sams Teach Yourself the Internet in 24 Hours," by Ned Snell, Sams Publishing, published Jun. 17, 1999, http://proquest.safaribooksonline.com/JVXSL.asp (last accessed on Jul. 21, 2005).

Press Release, "ZY.COM: ZY.com makes creating and publishing websites simple and FREE for everyone", M2 Presswire; Coventry; Mar. 26, 1998, pp. 2, extracted on Internet on Oct. 29, 2001 from Proquest database [http://proquest.umi.com/pqdweb].

Glenn Kennedy et al., "Web to watch CAD companies online", from CADalyst, Sep. 1, 2000.

Rob Fanjogy, "New design software connects colleagues", from Professional Builder, Mar. 1, 1999.

Ouchi et al., "Handshake telephone system to communicate with voice and force", 1997, IEEE, pp. 466-471.

Sato et al., "Measuring system for grasping", 1996, IEEE, pp. 292-297.

Karlsson et al., "A glove equipped with finger flexion sensors as command generator used in fuzzy control system", 1998, IEEE, pp. 1330-1334.

Office Action issued on Jul. 31, 2007 by US PTO on U.S. Appl. No. 09/929,610.

Office Action issued by EPO on Aug. 23, 2007 regarding summons to attend oral proceedings on Application No. 02765976.2-1238.

Office Action issued on Oct. 2, 2007 by US PTO on U.S. Appl. No. 09/927,560.

Akers, Robert L., SCIFINANCE. (data processing in the securities industry), AI Magazine, Summer, 2001.

Kurt Chang, Solving pattern data exchange problems: standards development revived, From Bobbin, Oct. 1, 2000.

Cliff Currin, Financial Risk Management in Action. (petrochemicals industry), Chemical Week, Sep. 26, 2001.

Louis C. Gapenski, Debt-Maturity Structures Should Match Risk Preferences, (statistical data included), Healthcare Financial Management Dec. 1999.

Don N. Kleinmuntz, Measuring and managing risk improves strategic financial Planning, Healthcare Financial Management, Jun. 1999.

Dean Villegas, WHIP! Your AutoCAD drawings, From CADalyst, Feb. 1, 1998.

Office Action issued Oct. 23, 2007 by EPO on European Application No. 02 802 758.9 -2221.

Office Action issued on Nov. 30, 2007 by US PTO on U.S. Appl. No. 09/704,838.

Office Action issued on Jan. 4, 2008 by US PTO on U.S. Appl. No. 09/929,610.

Office Action issued on Feb. 6, 2008 by US PTO on U.S. Appl. No. 09/976,443.

Office Action issued on Feb. 8, 2008 by US PTO on U.S. Appl. No. 09/927,560.

Office Action issued Jan. 31, 2008 by EPO on Application No. 00959 864.0.

Office Action issued on Apr. 3, 2008 by US PTO on U.S. Appl. No. 09/927,560.

Office Action issued on Jul. 24, 2008 by US PTO on U.S. Appl. No. 09/976,443.

*Dayco* Statement Regarding Related Applications, Nov. 9, 1998.

Campbell, T., "Get plugged in: Service with a :-)", Sales and Marketing Management, New York, Mar. 1999, pp. 62-6E, vol. 151, Issue 3, extracted on Internet from http://proquest.umi.com on Mar. 4, 2003.

Office Action issued in European Application No. 02802758.9 by European Patent Office on Oct. 23, 2007.

Office Action issued in U.S. Appl. No. 09/580,273, mailing date Apr. 5, 2005.

Office Action issued in U.S. Appl. No. 09/704,838, mailing date Feb. 6, 2004.

Office Action issued in U.S. Appl. No. 09/704,838, mailing date Aug. 1, 2005.

Office Action issued in U.S. Appl. No. 09/704,838, mailing date Mar. 9, 2006.

Office Action issued in U.S. Appl. No. 09/704,838, mailing date Oct. 20, 2006.

Office Action issued in U.S. Appl. No. 09/704,838, mailing date Jul. 13, 2007.

Office Action issued in U.S. Appl. No. 09/704,838, mailing date May 5, 2008.

Office Action issued in U.S. Appl. No. 09/704,838, mailing date Oct. 30, 2008.

Office Action issued in U.S. Appl. No. 09/704,838, mailing date Apr. 22, 2009.

Office Action issued in U.S. Appl. No. 09/704,838, mailing date May 27, 2009.

Office Action issued in U.S. Appl. No. 09/927,560, mailing date Aug. 25, 2006.

Office Action issued in U.S. Appl. No. 09/927,560, mailing date May 2, 2007.

Office Action issued in U.S. Appl. No. 09/929,610, mailing date Aug. 25, 2006.

Office Action issued in U.S. Appl. No. 09/929,610, mailing date Mar. 21, 2007.

Office Action issued in U.S. Appl. No. 09/929,610, mailing date Aug. 20, 2008.

Office Action issued in U.S. Appl. No. 09/929,610, mailing date Mar. 4, 2009.

Office Action issued in U.S. Appl. No. 09/929,735, mailing date Mar. 17, 2003.

Office Action issued in U.S. Appl. No. 09/929,735, mailing date Sep. 24, 2003.

Office Action issued in U.S. Appl. No. 09/929,735, mailing date Mar. 5, 2004.

Office Action issued in U.S. Appl. No. 09/929,735, mailing date Jul. 6, 2005.

Office Action issued in U.S. Appl. No. 09/929,735, mailing date Jan. 31, 2006.

Office Action issued in U.S. Appl. No. 09/929,735, mailing date Jun. 27, 2006.

Office Action issued in U.S. Appl. No. 09/976,443, mailing date Apr. 28, 2003.

Office Action issued in U.S. Appl. No. 09/976,443, mailing date Dec. 24, 2003.

Office Action issued in U.S. Appl. No. 09/976,443, mailing date Sep. 8, 2004.

Office Action issued in U.S. Appl. No. 09/976,443, mailing date Mar. 29, 2005.

Office Action issued in U.S. Appl. No. 09/976,443, mailing date Oct. 4, 2005.

Office Action issued in U.S. Appl. No. 09/976,443, mailing date Mar. 24, 2006.

Office Action issued in U.S. Appl. No. 09/976,443, mailing date Nov. 15, 2006.

Office Action issued in U.S. Appl. No. 09/976,443, mailing date Jan. 7, 2009.

Press release, "Kana and Webline Team to Provide Industry's Most Comprehensive Online Customer Interaction Solution," Business Wire, New York, Apr. 20, 1999, pp. 1-3, extracted on Internet from http://proquest.umi.com on Mar. 4, 2003; downloaded from Internet Jun. 10, 2001.

Press Release, "Webline Communications' Products Selected by Trimark Investments to Increase Service on Financial Adviser Web Site," Business Wire, Mar. 22, 1999, extracted on Internet from Dialog database on Feb. 26, 2003.

Press Release, "Webline Communications Unveils New Customer Interaction Software Suite for Enabling Interactive E-Commerce and Customer Service," Business Wire, New York, Aug. 16, 1999, pp. 1-4, extracted on Internet from http://proquest.umi.com on Mar. 4, 2003.

www.runmoney.com, May 2000, downloaded from Internet on Jan. 19, 2001.

"GE Center for Financial Learning; Planning Tools, 'How Much Am I Spending?'" Internet Article, Online! 1999-2000. Retrieved from the Internet: www.financiallearning.com/ge/calculator. jsp?oid=9705&BV_SessionID=@@@@1126282150. 1003930066@@@@&BV_EngineID=cadccfkmghkgbedcgceckh. 0> on Oct. 24, 2001; 3 pgs.

Bacchus, F. et al. "Planning for Temporally Extended Goals" 13th International Conference on AI, Portland, OR, 1996; *AAAI-96 Proceedings*, pp. 1215-1222.

Bellone, R. "Forecast Your Clients' Financial Future" *Accounting Technology*, vol. 12, No. 3, 1996. Retrieved from the Internet: http://proquest.umi.com on Jun. 19, 2002; 6 pgs.

Booker, E. "A Think-Tank Vision" *Interntweek.com*, Sep. 10, 1999. Retrieved from the Internet: www.internetwk.com, 3 pgs.

Carey, T. "Putting the Brains in Your PC" *Barrons*, vol. 78, Issue 49, 1998. Retrieved from the Internet: http://proquest.umi.com on Jun. 18, 2002; 4 pgs.

Dayco Statement Regarding Related Applications filed in U.S. Appl. No. 09/520,580 on Nov. 26, 2003.

Deb, K. "Solving Goal Programming Problems Using Multi-Objective Genetic Algorithms" Proceedings of the Congress on Evolutionary Computing, Jul. 6-9, 1999; pp. 77-84.

Epstein, E. "Converging Future" *Info World News*, Jan. 7, 2000. Retrieved from the Internet: http://sandbox.xerox.com, 8 pgs.

European Patent Application No. 00976918.3 (Publication No. EP 1228470), Communication pursuant to Article 96(2) EPC, with Annex to the communication; Date: Oct. 24, 2002.

European Patent Application No. 00991933.3 (Publication No. EP 1228473), Communication pursuant to Article 94(3) EPC, with Annex to the communication; Date: Feb. 16, 2009.

European Patent Application No. 01927371.3 (Publication No. EP 1269386), Communication pursuant to Article 96(2), with Annex to the communication; Date: Jun. 5, 2003.

European Patent Application No. 01927371.3 (Publication No. EP 1269386), Decision to refuse a European Patent Application, with Annex to the communication; Date: Mar. 17, 2005.

European Patent Application No. 01927371.3 (Publication No. EP 1269386), Minutes of the oral proceedings before the Examining Division; Date of Proceedings: Feb. 17, 2005, Date of Minutes: Mar. 17, 2005.

European Patent Application No. 01927371.3 (Publication No. EP 1269386), Summons to attend oral proceedings, with Annex to the communication; Date: Oct. 27, 2004.

European Patent Application No. 02759326.8 (Publication No. EP 1419468), Communication pursuant to Article 96(2) EPC, with Annex to the communication; Date: Sep. 19, 2005.

European Patent Application No. 02759326.8 (Publication No. EP 1419468), Minutes of the oral proceedings before the Examining Division, with Annex to the communication; Date of Proceedings: Nov. 4, 2009, Date of Minutes: Dec. 10, 2009.

European Patent Application No. 02759326.8 (Publication No. EP 1419468), Summons to attend oral proceedings, with Annex to the communication; Date: Jan. 28, 2009.

European Patent Application No. 02765975.4 (Publication No. EP 1423772), Supplementary Search Report; Date of Mailing: Aug. 2, 2006.

European Patent Application No. 02765976.2 (Publication No. EP 1423813), Communication pursuant to Article 96(2) EPC, with Annex to the communication; Date: Feb. 10, 2005.

European Patent Application No. 02765976.2 (Publication No. EP 1423813), Communication regarding the declaration under Rule 45 EPC, with Annex to the communication; Date: Jul. 1, 2004.

European Patent Application No. 02765976.2 (Publication No. EP 1423813), Decision to refuse a European Patent application; Date: Jan. 21, 2008.

European Patent Application No. 02765976.2 (Publication No. EP 1423813), Minutes of the oral proceedings before the Examining Division, with Annexes to the communication; Date of Proceedings: Nov. 27, 2007; Date of Minutes: Jan. 21, 2008.

European Patent Application No. 02765976.2 (Publication No. EP 1423813), Result of consultation of Nov. 19, 2007 with Annex to the communication; Date: Nov. 23, 2007.

European Patent Application No. 02794694.6 (Publication No. EP 1423815), Communication pursuant to Article 96(2) EPC, with Annex to the communication; Date: Jul. 20, 2006.

European Patent Application No. 02794694.6 (Publication No. EP 1423815), Communication regarding the declaration under Rule 45 EPC, with Annex to the Communication; Date: Oct. 29, 2004.

European Patent Application No. 02802758.9 (Publication No. EP 1435033), Communication regarding the declaration under Rule 45 EPC, with Annex to the communication; Date: Mar. 27, 2006.

European Patent Application No. 02802758.9 (Publication No. EP 1435033), Minutes of the oral proceedings before the Examining Division, with Annexes to the communication; Date of Proceedings: Jun. 17, 2009, Date of Minutes: Jun. 30, 2009.

European Patent Application No. 02802758.9 (Publication No. EP 1435033), Summons to attend oral proceedings, with Annex to the communication; Date: Mar. 5, 2009.

European Patent Application No. EP 01927370.5 (Publication No. EP 1264245), Communication pursuant to Article 96(2) EPC, with Annex to the communication; Date: Aug. 6, 2007.

Fano, A.E. "A Strategy-Based Theory of Planning for Goal-Based Scenario-Learning Environments" *Dissertation Abstracts International*, vol. 57, Issue 11-B, 1996. Retrieved from Dialog, File 35: Dissertation Abs Online, 1 pg.

Fano, A.E. "Shopper's Eye: Using Location-based Filtering for a Shopping Agent in the Physical World" Proceedings of the 2nd International Conference on Autonomous Agents, May 9-13, 1998. Retrieved from Dialog, File 2: INSPEC, 2 pgs.

Fischer, D.E. et al. *Security Analysis and Portfolio Management*. Fifth Edition. Prentice-Hall, Inc., New Jersey, 1991; pp. 89-158.

International Patent Application No. PCT/US00/30389 (Publication No. WO 01/33467), Declaration of Non-Establishment of International Search Report Under PCT Article 17(2)(a); Date of Mailing: Sep. 18, 2001.

International Patent Application No. PCT/US00/30389 (Publication No. WO 01/33467), International Preliminary Examination Report; Date of Completion: Aug. 15, 2002.

International Patent Application No. PCT/US00/30423 (Publication No. WO 01/33402), Declaration of Non-Establishment of International Search Report Under PCT Article 17(2)(a); Date of Mailing: Nov. 5, 2001.

International Patent Application No. PCT/US00/30423 (Publication No. WO 01/33402), International Preliminary Examination Report; Date of Completion: Sep. 14, 2003.

International Patent Application No. PCT/US00/41850 (Publication No. WO 01/37187), Declaration of Non-Establishment of International Search Report Under PCT Article 17(2)(a); Date of Mailing: Feb. 5, 2002.

International Patent Application No. PCT/US00/41850 (Publication No. WO 01/37187), International Preliminary Examination Report; Date of Completion: Sep. 7, 2002.

International Patent Application No. PCT/US00/41852 (Publication No. WO 01/33474), Declaration of Non-Establishment of International Search Report Under PCT Article 17(2)(a); Date of Mailing: Sep. 25, 2001.

International Patent Application No. PCT/US00/41852 (Publication No. WO 01/33474), International Preliminary Examination Report; Date of Completion: Jul. 26, 2002.

International Patent Application No. PCT/US00/41855 (Publication No. WO 01/67334), Declaration of Non-Establishment of International Search Report Under PCT Article 17(2)(a); Date of Mailing: Aug. 23, 2001.

International Patent Application No. PCT/US00/41855 (Publication No. WO 01/67334), International Preliminary Examination Report; Date of Completion: Feb. 10, 2002.

International Patent Application No. PCT/US00/41872 (Publication No. WO 01/33476), Declaration of Non-Establishment of International Search Report Under PCT Article 17(2)(a); Date of Mailing: May 28, 2003.

International Patent Application No. PCT/US00/41872 (Publication No. WO 01/33476), International Preliminary Examination Report; Date of Completion: Apr. 8, 2005.

International Patent Application No. PCT/US01/40213 (Publication No. WO 01/65907), Declaration of Non-Establishment of International Search Report Under PCT Article 17(2)(a); Date of Mailing: Jun. 15, 2001.

International Patent Application No. PCT/US01/40213 (Publication No. WO 01/65907), International Preliminary Examination Report; Date of Completion: Oct. 16, 2003.
International Patent Application No. PCT/US01/40213 (Publication No. WO 01/65907), Written Opinion; Date of Mailing: Apr. 4, 2003.
International Patent Application No. PCT/US01/40214 (Publication No. WO 01/67340), International Preliminary Examination Report; Date of Completion: Jul. 28, 2002.
International Patent Application No. PCT/US01/40214 (Publication No. WO 01/67340), International Search Report; Date of Mailing: Nov. 9, 2001.
International Patent Application No. PCT/US02/25488 (Publication No. WO 03/17040), International Preliminary Examination Report; Date of Completion: May 19, 2004.
International Patent Application No. PCT/US02/25488 (Publication No. WO 03/17040), International Search Report; Date of Mailing: Jun. 23, 2003.
International Patent Application No. PCT/US02/25489 (Publication No. WO 03/14884), International Preliminary Examination Report; Date of Completion: Jul. 2, 2003.
International Patent Application No. PCT/US02/25489 (Publication No. WO 03/14884), International Search Report; Date of Mailing: Mar. 6, 2003.
International Patent Application No. PCT/US02/25491 (Publication No. WO 03/17041), International Preliminary Examination Report; Date of Completion: Jun. 26, 2003.
International Patent Application No. PCT/US02/25491 (Publication No. WO 03/17041), International Search Report; Date of Mailing: May 29, 2003.
International Patent Application No. PCT/US02/25492 (Publication No. WO 03/39227), International Preliminary Examination Report; Date of Completion: Nov. 2, 2003.
International Patent Application No. PCT/US02/25492 (Publication No. WO 03/39227), International Search Report; Date of Mailing: Aug. 18, 2003.
International Patent Application No. PCT/US02/25500 (Publication No. WO 03/17168), Declaration of Non-Establishment of International Search Report Under PCT Article 17(2)(a); Date of Mailing: Apr. 22, 2003.
International Patent Application No. PCT/US02/25500 (Publication No. WO 03/17168), International Preliminary Examination Report; Date of Completion: Jan. 12, 2004.
Intuit Press Release, "CNNfn.com and Intuit Announce Quicken.com on Fn, the Premier Personal Financial Resource on the Web" Dec. 2, 1997; 2 pgs.
Jaffe, L.A. "Quicken Financial Planner" Harvard Computer Review, vol. 14, No. 1, Apr. 1997.
Meahdra, M. "The ABC's of Netscape Composer" SYBEX, SanFransisco-Paris-Dusseldorf-Soest, 1997; p. 15, 66.
Mortenson, P. "Financial Planning by Computer" *Best's Review (Life+/Health)*, vol. 85, No. 2, 1984; pp. 38, 40.
Nelson, S.L. *Quicken 98 for Windows for Dummies*. IDG Books Worldwide, Inc., 1998. Table of Contents, 15 pgs.
Office Action issued in U.S. Appl. No. 09/430,993; Date Mailed: Aug. 29, 2002.
Office Action issued in U.S. Appl. No. 09/431,389; Date Mailed: Nov. 7, 2001.
Office Action issued in U.S. Appl. No. 09/431,394; Date Mailed: Jul. 15, 2002.
Office Action issued in U.S. Appl. No. 09/431,417; Date Mailed: Jun. 15, 2001.
Office Action issued in U.S. Appl. No. 09/431,668; Date Mailed: May 24, 2002.
Office Action issued in U.S. Appl. No. 09/431,684; Date Mailed: Sep. 9, 2002.
Office Action issued in U.S. Appl. No. 09/431,684, Restriction Requirement; Mail Date: Jul. 8, 2002.
Office Action issued in U.S. Appl. No. 09/451,596, Restriction Requirement; Mail Date: Jun. 27, 2002.
Office Action issued in U.S. Appl. No. 09/451,667, Restriction Requirement; Mail Date: Jun. 27, 2002.
Office Action issued in U.S. Appl. No. 09/451,670; Date Mailed: Oct. 23, 2001.
Office Action issued in U.S. Appl. No. 09/451,675; Date Mailed: Aug. 2, 2002.
Office Action issued in U.S. Appl. No. 09/452,273, Restriction Requirement; Date Mailed: Jul. 23, 2002.
Office Action issued in U.S. Appl. No. 09/452,273; Date Mailed: Aug. 29, 2002.
Office Action issued in U.S. Appl. No. 09/452,276; Date Mailed: Jul. 18, 2002.
Office Action issued in U.S. Appl. No. 09/452,280; Date Mailed: Sep. 19, 2002.
Office Action issued in U.S. Appl. No. 09/520,564; Date Mailed: Apr. 14, 2003.
Office Action issued in U.S. Appl. No. 09/520,564; Date Mailed: Jul. 1, 2002.
Office Action issued in U.S. Appl. No. 09/520,580, Advisory Action; Date Mailed: Feb. 9, 2005.
Office Action issued in U.S. Appl. No. 09/520,580, Advisory Action; Date Mailed: Aug. 6, 2003.
Office Action issued in U.S. Appl. No. 09/520,580, Advisory Action; Date Mailed: Oct. 6, 2004.
Office Action issued in U.S. Appl. No. 09/520,580, Notice of Allowance; Date Mailed: Dec. 1, 2005.
Office Action issued in U.S. Appl. No. 09/520,580; Date Mailed: Mar. 12, 2003.
Office Action issued in U.S. Appl. No. 09/520,580; Date Mailed: Jun. 16, 2004.
Office Action issued in U.S. Appl. No. 09/520,580; Date Mailed: Jul. 25, 2002.
Office Action issued in U.S. Appl. No. 09/520,580; Date Mailed: Dec. 4, 2003.
Office Action issued in U.S. Appl. No. 09/520,600; Date Mailed: Sep. 26, 2002.
Office Action issued in U.S. Appl. No. 09/520,938; Date Mailed: Feb. 19, 2003.
Office Action issued in U.S. Appl. No. 09/520,940; Decision on Appeal by the Board of Patent Appeals and Interferences; Decided: Apr. 23, 2007.
Office Action issued in U.S. Appl. No. 09/520,940; Examiner's Answer before the Board of Patent Appeals and Interferences; Date Mailed: Mar. 21, 2006.
Office Action issued in U.S. Appl. No. 09/520,940; Advisory Action; Date Mailed: Jul. 12, 2004.
Office Action issued in U.S. Appl. No. 09/520,940; Date Mailed: Jan. 30, 2004.
Office Action issued in U.S. Appl. No. 09/520,940; Date Mailed: Feb. 25, 2003.
Office Action issued in U.S. Appl. No. 09/520,940; Date Mailed: Apr. 8, 2005.
Office Action issued in U.S. Appl. No. 09/520,940; Date Mailed: Jun. 25, 2002.
Office Action issued in U.S. Appl. No. 09/520,940; Date Mailed: Aug. 26, 2003.
Office Action issued in U.S. Appl. No. 09/520,940; Date Mailed: Oct. 5, 2004.
Office Action issued in U.S. Appl. No. 09/520,943; Advisory Action; Date Mailed: Mar. 12, 2004.
Office Action issued in U.S. Appl. No. 09/520,943; Decision on Appeal Before the Board of Patent Appeals and Interferences, Appeal No. 2007-0868; Decided: Feb. 28, 2008.
Office Action issued in U.S. Appl. No. 09/520,943, Examiner Interview Summary; Date Mailed: Sep. 19, 2006.
Office Action issued in U.S. Appl. No. 09/520,943; Examiner Interview Summary; Date Mailed: Oct. 20, 2009.
Office Action issued in U.S. Appl. No. 09/520,943, Examiner's Answer Before the Board of Patent Appeals and Interferences; Date Mailed: Sep. 26, 2006.
Office Action issued in U.S. Appl. No. 09/520,943, Examiner's Answer Before the Board of Patent Appeals and Interferences; Date Mailed: Nov. 7, 2005.
Office Action issued in U.S. Appl. No. 09/520,943; Date Mailed: Jan. 6, 2009.
Office Action issued in U.S. Appl. No. 09/520,943; Date Mailed: Jan. 13, 2005.

Office Action issued in U.S. Appl. No. 09/520,943; Date Mailed: Mar. 11, 2003.
Office Action issued in U.S. Appl. No. 09/520,943; Date Mailed: Jul. 8, 2009.
Office Action issued in U.S. Appl. No. 09/520,943; Date Mailed: Jul. 14, 2008.
Office Action issued in U.S. Appl. No. 09/520,943; Date Mailed: Jul. 19, 2004.
Office Action issued in U.S. Appl. No. 09/520,943; Date Mailed: Nov. 18, 2003.
Office Action issued in U.S. Appl. No. 09/520,944; Date Mailed: Mar. 14, 2003.
Office Action issued in U.S. Appl. No. 09/521,470; Date Mailed: Apr. 23, 2003.
Office Action issued in U.S. Appl. No. 09/579,849; Date Mailed: Jul. 25, 2003.
Office Action issued in U.S. Appl. No. 09/579,852; Date Mailed: Mar. 25, 2003.
Office Action issued in U.S. Appl. No. 09/579,853; Date Mailed: Oct. 15, 2002.
Office Action issued in U.S. Appl. No. 09/579,854; Date Mailed: Dec. 18, 2002.
Office Action issued in U.S. Appl. No. 09/580,214; Date Mailed: Feb. 4, 2003.
Office Action issued in U.S. Appl. No. 09/580,273, Restriction Requirement; Date Mailed: Sep. 8, 2003.
Office Action issued in U.S. Appl. No. 09/580,276; Date Mailed: Dec. 18, 2002.
Office Action issued in U.S. Appl. No. 09/580,349; Date Mailed: Jul. 25, 2003.
Office Action issued in U.S. Appl. No. 09/580,350; Date Mailed: Jul. 24, 2003.
Office Action issued in U.S. Appl. No. 09/580,351; Date Mailed: Dec. 3, 2002.
Office Action issued in U.S. Appl. No. 09/580,352; Date Mailed: Jul. 8, 2002.
Office Action issued in U.S. Appl. No. 09/580,353; Date Mailed: Jul. 30, 2003.
Office Action issued in U.S. Appl. No. 09/580,508; Date Mailed: Jul. 15, 2003.
Office Action issued in U.S. Appl. No. 09/580,509; Date Mailed: Feb. 27, 2002.
Office Action issued in U.S. Appl. No. 09/584,165, Restriction Requirement; Date Mailed: Jul. 29, 2003.
Office Action issued in U.S. Appl. No. 09/584,165; Date Mailed: Oct. 8, 2003.
Office Action issued in U.S. Appl. No. 09/704,838, Examiner Interview Summary; Date Mailed: Feb. 8, 2008.
Office Action issued in U.S. Appl. No. 09/704,838; Date Mailed: Dec. 9, 2009.
Office Action issued in U.S. Appl. No. 09/929,610, Examiner Interview Summary; Date Mailed: Jun. 3, 2009.
Office Action issued in U.S. Appl. No. 09/929,735, Advisory Action; Date Mailed: Sep. 14, 2005.
Office Action issued in U.S. Appl. No. 09/929,735, Examiner Interview Summary; Date Mailed: Jun. 29, 2007.
Office Action issued in U.S. Appl. No. 09/929,735, Examiner Interview Summary; Date Mailed: Nov. 22, 2004.
Office Action issued in U.S. Appl. No. 09/929,735, Notice of Allowance with Examiner Interview Summary; Date Mailed: Feb. 15, 2007.
Office Action issued in U.S. Appl. No. 09/929,735, Notice of Allowance; Date Mailed: Apr. 30, 2007.
Office Action issued in U.S. Appl. No. 09/929,735; Date Mailed: Oct. 19, 2004.
Office Action issued in U.S. Appl. No. 09/976,443, Notice of Allowance; Date Mailed: Jun. 26, 2009.
Office Action issued in U.S. Appl. No. 09/976,443, Notice of Allowance; Date Mailed: Oct. 29, 2009.
Palma-Dos-Reis, A. "Designing Personalized Intelligent Financial Decision Support Systems" *Decision Support Systems*, vol. 26, 1999; pp. 31-47.
Press Release, "Webline Communications Unveils New Customer Interaction Software Suite for Enabling Interactive E-Commerce and Customer Service", Business Wire; New York; Apr. 20, 1999, pp. 1-3[1].
Probst, G. "Gerez Votre Budget Familial Sur FX—702 P" Micro-Systemes, Apr. 1983; pp. 133, 135, with English abstract.
Rachlin, R. et al. *Accounting and Financial Fundamentals for Nonfinancial Executives*. Rachlin, R. and Sweeny, H.W.A. (eds.) AMACOM, New York, 1972; pp. 139-143.
Reeves, J. "Growing Your Practice Beyond Financial Planning: The CPA as Investment Adviser" *CPA Journal*, Sep. 1998, pp. 46-52.
Texas Instruments TI-89 Advanced Graphing Calculator, from http://www.amazon.com, hard-copy printed Mar. 18, 2003 (excerpts: Table of Contents, Chapter 16, and Chapter 23); 56 pages.
TI-89 and Voyage™ 200PLT product guide, and TI-89/92 Plus Graphing Calculator Tasks (copyright 1995-2003) (excerpts); 158 pages.
Waldron, H.C. "The Game of Life" *LIMRA's Marketfacts*, vol. 16, Issue 5, Sep./Oct. 1997. Retrieved from the Internet: http://proquest.umi.com on Jun. 17, 2002, 5 pgs.
Waller, K.M. "Filling the Knowledge Gap" *Journal of Accountancy*, vol. 187, Issue 4, 1999. Retrieved from the Internet: http://proquest.umi.com on Jun. 21, 2002, 5 pgs.
Weverka, P. *Microsoft Money 98 for Dummies*. IDG Books Worldwide, Inc., Foster City, CA, 1997; pp. 21-29, 59-79, 149-161, and 207-229.
Williams, D.C. "Automating a Financial Planning Service" *ABA Banking Journal*, vol. 77, No. 10, 1985; pp. 82, 84.
Das, S. "Increasing Agent Autonomy by Learning From Events" PADD98; 2nd Int'l. Conf. on the Practical application of Knowledge Discovery and Data Mining; London, UK, 1998; pp. 241-260.
Office Action issued in U.S. Appl. No. 09/431,390; Date Mailed: Oct. 24, 2001 (as indicated on the USPTO file wrapper table of contents).
Office Action issued in U.S. Appl. No. 09/520,943; Date Mailed: Mar. 3, 2010.
Office Action issued in U.S. Appl. No. 09/976,443, Notice of Allowance; Date Mailed: Feb. 17, 2010.
Office Action issued in U.S. Appl. No. 09/704,838, Notice of Allowance; Date Mailed: Jun. 15, 2010.
Office Action issued in U.S. Appl. No. 09/929,610, Notice of Allowability; Date Mailed: May 26, 2010.
Office Action issued in U.S. Appl. No. 09/929,610, Notice of Allowance; Date Mailed: Apr. 5, 2010.
Office Action issued in U.S. Appl. No. 09/976,443, Notice of Allowance; Date Mailed: Apr. 19, 2010.

* cited by examiner

AUTOMATED FINANCIAL PORTFOLIO COACHING AND RISK MANAGEMENT SYSTEM

CROSS REFERENCE TO RELATED APPLICATIONS

The present application is a continuation of a parent application Ser. No. 09/705,287 filed Nov. 1, 2000, now abandoned entitled "FINANCIAL PORTFOLIO RISK MANAGEMENT", of the assignee of the present invention, incorporated herein by reference.

Furthermore, the present application is a continuation-in-part of U.S. application Ser. No. 09/431,390 entitled "SYSTEM, METHOD AND ARTICLE OF MANUFACTURE FOR A FINANCIAL RISK MODELING SUBSYSTEM" filed Nov. 1, 1999, now abandoned and U.S. application Ser. No. 09/580,352 entitled "SYSTEM, METHOD AND ARTICLE OF MANUFACTURE FOR PERFORMING A RISK ANALYSIS USING A NETWORK-BASED PERSONAL INVESTMENT MANAGER" filed May 25, 2000 now abandoned both of which we incorporated herein by reference.

FIELD OF INVENTION

The present invention relates generally to computerized information systems and more particularly to web-enabled computer implemented financial modeling systems.

BACKGROUND OF THE INVENTION

In today's economic environment, increasing number of individuals are supplementing their retirement plans with personal investment portfolios. Rather than investing in mutual funds, everyday greater numbers of individuals are opting for individually managed portfolios. Until recently, this option was only available to the very wealthy. However, smaller investors are becoming aware of the benefits of an individually managed stock portfolio.

These small investors are increasingly relying upon computer-based systems that organize their financial assets and liabilities and further provide them with a summary of their financial health. However, these systems tend to focus on the administrative aspects of financial planning without enabling the user to make reasoned choices about their financial futures. Furthermore, these systems are limited by their inability to dynamically analyze the financial goals. These limitations are counterproductive to the user's needs to develop and manage an integrated personal financial plan from an executive decision-making perspective.

Many existing financial management systems allow users to electronically organize their financial assets and liabilities. These systems typically focus on presenting the user with a transactional summary of their financial health. Furthermore, these systems typically rely on the user to continually update their personal financial data. As a result, these systems are merely data-driven calculators that are incapable of providing the user with meaningful financial advice tailored to their financial intentions and expectations.

Another problem with many existing financial management systems is that the user is typically limited to managing the transactional details of their financial data. In these systems the user is shielded from the planning and deciding aspects of developing their financial plan. Accordingly, the user learns very little from the process and remains heavily dependent on the system to provide an accurate summary of their financial health. These limitations further exacerbate the lack of trust inherent within the relationship between the user and the financial management system.

Furthermore, many existing financial management systems merely project a future value of the user's financial portfolio without providing an indication of the likelihood of achieving that value. Thus, the user is left without any real sense of how to compare one financial plan to another. Consequently, these systems fail to foster a deeper understanding of the risks and/or rewards associated with reasoned financial planning.

Also, few investors have a real understanding of some basic investment parameters such as their risk tolerance, investment style market preferences. These personal financial parameters are what financial advisors would use to help an individual investor devise an investment strategy. Most of the current automated financial management tools are unable to help a user tailor a personal investment strategy.

Furthermore, none of the current financial modeling tools available to the smaller investor can model an existing investment portfolio and help the user move toward an ideal portfolio that would better match the user's investment style, risk tolerance, etc. Also, none of the current portfolio modeling tools available to the average investor have the capability of recommending individual securities based on the user's personal financial parameters and preferences. Since most average investors are not able to interpret the results of these sophisticated algorithms, automated context sensitive coaching is another essential ingredient necessary to enable the user to assume an executive decision making role in his personal financial affairs.

No web-based system currently exists that brings into a personal financial modeling tool, professional level industry accepted algorithms and modeling techniques to forecast the future performance of an investment model, and allow the user to analyze his or her financial portfolio using these techniques, and take advantage of automated and live coaching along the way.

SUMMARY OF THE INVENTION

In general terms, the present invention relates to an online, Internet enabled financial management system for modeling the risk associated with the investment portfolio of a user. The system operates in a collaborative computing environment between the user and a financial advisor and comprises a service level subsystem and an advice generating subsystem. The service level subsystem allows the user to negotiate a service level agreement that defines the user's desired level of support and limits access to user provided information. The coaching generating subsystem is coupled to the service level subsystem and includes one or more advice engines that dynamically analyze the financial needs of the user in accordance with the user's service level agreement. Furthermore, the advice engine provides customized financial advice tailored to the user's life intentions.

In a preferred embodiment of the present invention, after the user and the financial modeling system have negotiated a service level suitable for the user and profitable for the financial institution, the user has access to a variety of financial tools including the risk modeling tool, based on the service level agreement.

In one embodiment of the present invention, the system includes a web-based portfolio modeling system, wherein information from various sources including external sources, and from the user inputs are combined and modeled into the user's current and historical financial portfolio. Furthermore, a financial portfolio risk management system creates a user personal investment profile based on a series of interactive exercises wherein the user is guided through a various scenarios generated by the system and the user responses are evaluated in terms of user risk tolerance, user investment style and user's bull/bear attitude toward the market.

Once the user's personal investment parameters have been determined, the system may generate an ideal portfolio based on the user's personal investment profile. Securities may be filtered through various filters reflecting the user's market attitude, investment style and risk tolerance and securities may be suggested to better mold the user's portfolio to his investment profile. The effect of swapping each security in and out of the user's portfolio is reflected in the model.

Also, the user's present portfolio may be compared to various market indices in terms of risk and return, and the result is graphed on a risk/reward map. The system compares the user's portfolio Value At Risk to that of some user selected benchmark indexes and/or securities. The user portfolio's volatility or Beta value can be compared to that of chosen benchmark Beta values.

In an alternative other embodiment of the present invention, by various algorithms, the system may project the user's portfolio value into the future and predict the possibility of the user achieving his investment target, as well as the probabilities of doing better and worse than the user minimum goal.

The present invention allows the user to access a web-based automated rule-based coaching system directing the user through all transactions within the system, focusing his attention to possible financial problems and suggesting possible general solutions. Furthermore, having received automated coaching, the user may further have access to a live advisor in order to receive more specific financial advice. The access to the automated coaching and the live advisor may be controlled in part by a service level agreement.

The present invention's financial risk modeling system is a dynamic, interactive and intelligent risk modeling tool that incorporates a user profiles as a parameter of the financial risk model. Thus the system can model the user's existing and historical financial portfolio, and further make appropriate user specific recommendation to help the user achieve his financial goals, by filtering and presenting to the user only securities that conform to the user's personal investment parameters. The present invention helps investors to objectively quantify the risk and reward in their personal portfolios. It supports investors in making optimal picks to meet their investment goals and avoid unaffordable losses. These and other advantages of the present invention will be apparent upon a study of the following descriptions and drawings.

BRIEF DESCRIPTION OF THE DRAWINGS

The foregoing and other objects, aspects and advantages are better understood form the following detailed description of a preferred embodiment of the invention with reference to the drawings, in which.

DETAILED DESCRIPTION OF THE PREFERRED EMBODIMENTS

Figure 1:
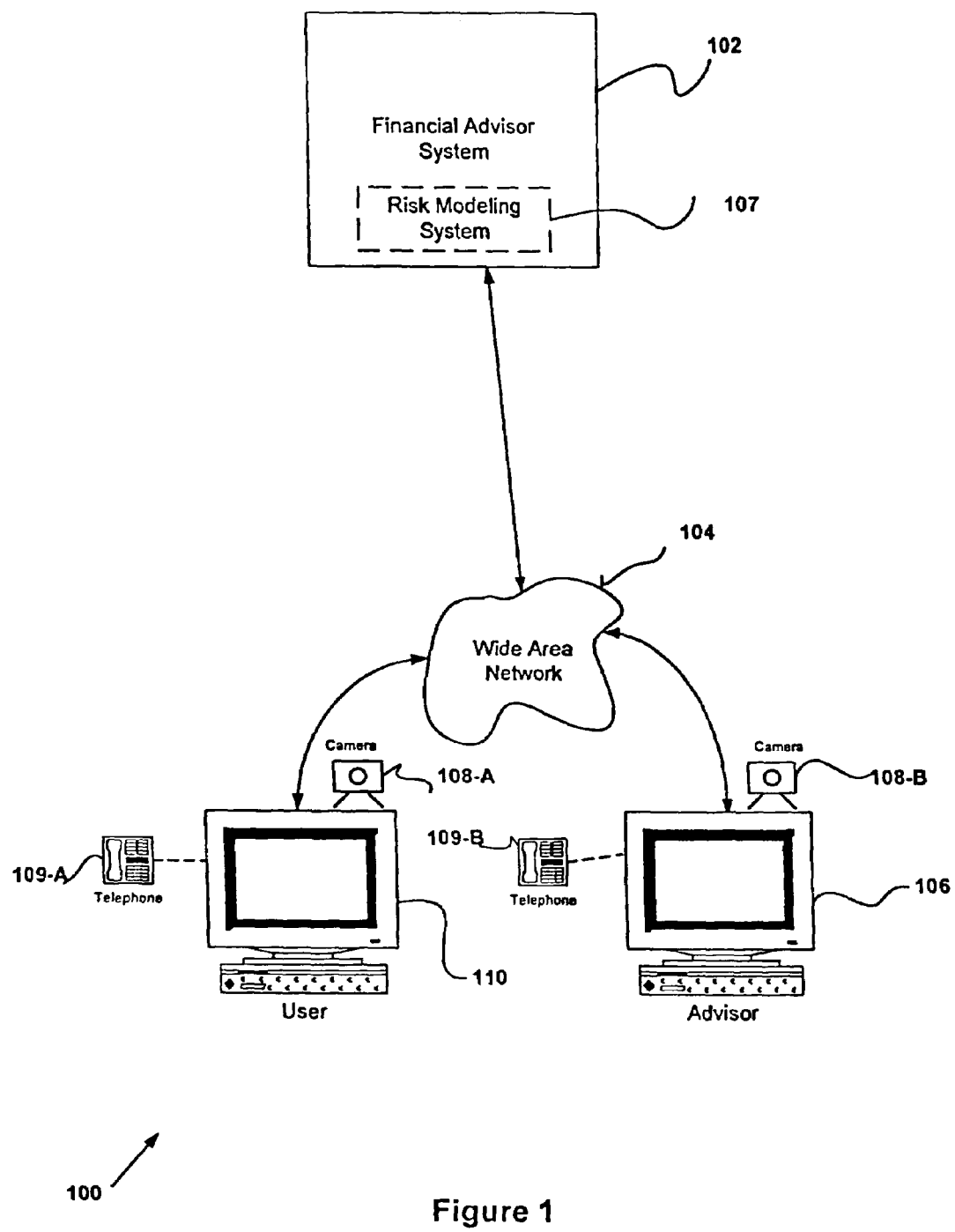
FIG. 1 illustrates a representative system architecture in accordance with a preferred embodiment.

FIG. 1 is an illustration of one embodiment of a financial management information system for providing personalized financial coaching in a collaborative computing environment between a user and a dedicated financial advisor. The term financial coaching as used herein this invention refers to coaching which may help a user consider a product, but never advises taking action on one. Such advice can only be dispensed by an accredited professional. Referring to FIG. 1, financial management system 100 comprises a financial coaching system 102 connected through a wide area network 104 to the live advisor terminal 106 a user terminal 110. The financial coaching system 102 further includes a risk modeling system 107 that performs various risk modeling operations on the user investment portfolio. The wide area network 104 is the Internet.

Preferably, the user may access the system through any type of a terminal 110. A typical user computer terminal would be described in more detail in FIG. 3.

The user (e.g. individuals or company representative seeking financial coaching) may access the system using a user terminal 110 (e.g. personal computer). A typical user computer terminal would be described in more detail in FIG. 3. The user terminal 110 is equipped with a proper interface to receive live streaming video or still pictures from the advisor video camera 108-B sent over the wide area network 104 to the user 110. Preferably, the user terminal 110 is further equipped with a video camera 108-A and software to transmit live streaming video from the user, across the network 104 to the live advisor at the advisor terminal 106.

Access to the live financial advisor 106 and all other services provided by the Financial management system is controlled and channeled through the Financial coaching system 102. The user can access the financial coaching system 102 through the network 104 or by telephone 109-A. A user telephone call is channeled through a call center discussed further in FIG. 2 to the Financial Coaching System and to the live advisor 106.

Preferably, the user may communicate with the financial coaching system 102 through any number of devices such as a handheld wireless personal organizer, pagers, cellular telephones, land telephones and regular desktop computers. All of the above equipment can act as a user terminal 110.

The live advisor terminal 106 is preferably equipped with the video camera 108-B for transmitting live streaming video. The live advisor 106 may further communicate with the user via a telephone 109-B.

Figure 2:
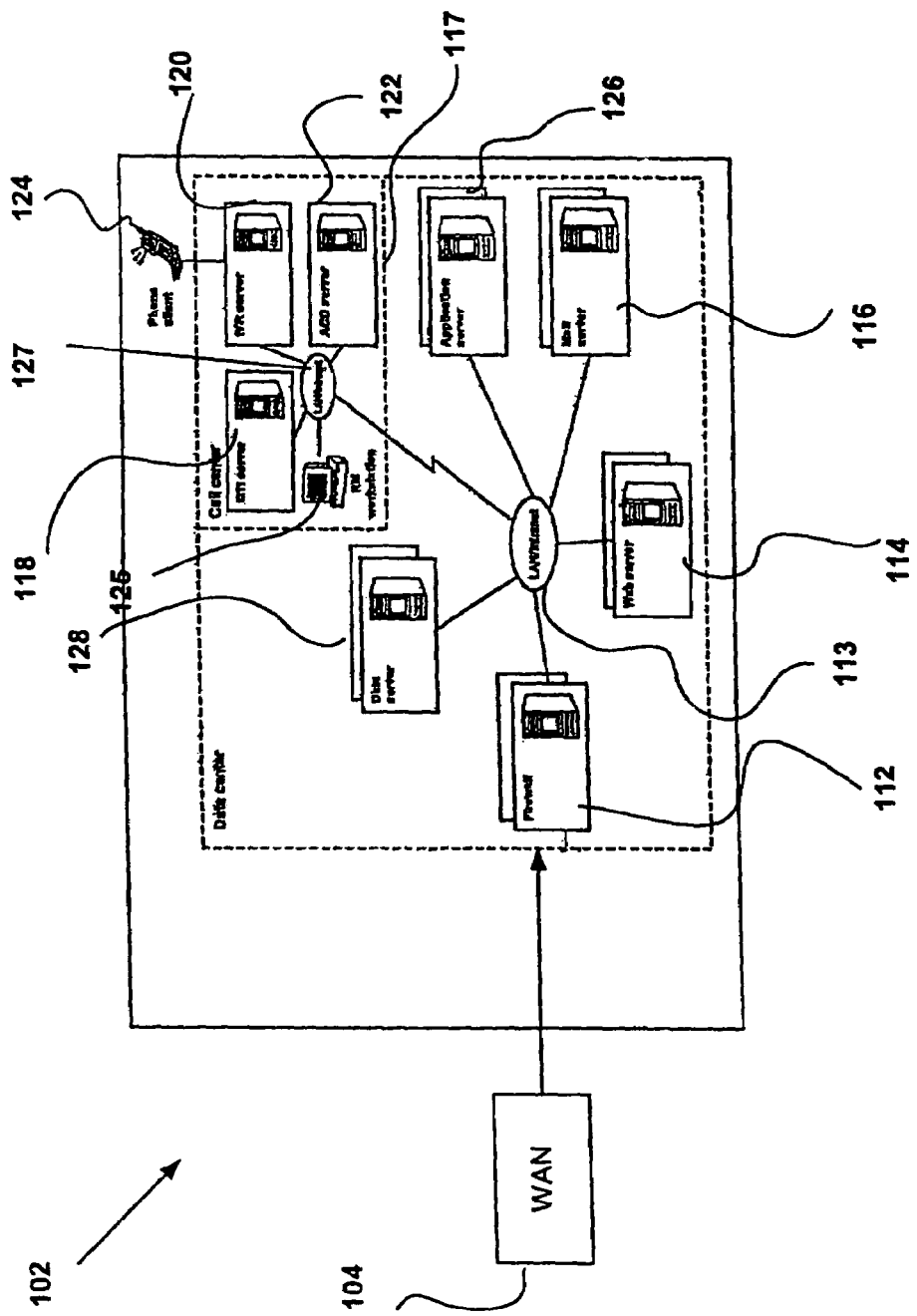
FIG. 2 is a block diagram of a financial management system.

FIG. 2 is a block diagram of an implementation of the financial coaching system 102. The user may access the system through the Internet 104 and through a firewall server 112. In a preferable implementation of the present invention, the wide area network is the Internet, intranet, etc. A Web server 114 provides the user with a personalized website providing an interactive interface between the user, the financial advisor and financial management system 100. The financial coaching system 102 further includes of a mail server 116, an application server 126, a call center 117 and a data server 128, all interconnected through a local area network 106. The local area network (LAN) 113 is connected to the Internet.

Security is important in any financial system. The firewall server 112 controls the access to the financial advisor system. The purpose and functionality of a firewall server is to prevent access to the system by unauthorized users and it would be appreciated by one skilled in the arts. Firewall servers are available through a variety of vendors and have become a standard feature of any secure system used as the primary defense against intruders and hackers.

The web server 114 provides a personalized interactive web page environment for the user to operate in once he accesses the system. The web page is acting as the web interface between the financial system Web pages may be created using the Hyper Text Markup Language (HTML), scripting languages such as Java Script™ or Pearl™ as well as Java™ applets, Visual Basic Script, Shockwave, Cold Fusion, etc. Creation of customized web page using any of the above programming languages is well known to one skilled in the arts. The personalized web page provides an environment and an interface for the user to interact with the financial coaching system 102. As an example, in one embodiment of the present invention, by selecting an appropriate icon from the interactive personalized website, the user is able to learn, plan, decide, transact and monitor his financial model. The mail server 116 handles electronic mail communication between the user and the financial coaching system 102. The Mail server 116 may operate using any standard protocol such as Simple Mail Transfer Protocol (SMTP) and it is within the scope of the knowledge of one skilled in the art.

The application server 126 is where the various modules of the financial coaching system reside. The modules include the various coaching engines, the LifePath and the portfolio modeling sub-systems. The applications may be implemented in any programming language, including the object oriented programming languages such as C++ or Java™ and be based on any platform such as UNIX™, Apple OS™ or Windows™ and NT™.

Alternatively, the user may also interact with financial coaching system 102 using a telephone 124. The user's call is channeled through the call center system 117. The call center 117 includes an Automatic Call Distributor (ACD) server 122, an Interactive Voice Response Server (IVR) 124, a Computer Telephony Integration (CTI) server 118 and a Relationship Manager (RM) workstation 125, all interconnected through the Local Area Network or intranet 127. The local area network 113 may also be used in interconnecting the various servers of call center. When the user calls into the financial coaching system 102 using a remote telephone 124, the IVR sever 124 receives the user's telephone call. The IVR system greets callers, prompting them for identification, and providing some information automatically. The Automatic Call Distributor (ACD) server 122 distributes the call using the Internet Protocol (IP) over the network, to the appropriate live coach. The Computer Telephony integration server (CTI) 118 acts as the link between the live advisor's telephone call and the workstation based applications and allows them to automatically work together. As an example, when the IVR server 120 obtains some information about the calling user, this information is delivered to the live advisor's workstation 106, so the advisor does not have to request the same information again. Once the telephone call is properly routed to the live advisor, the user can user other means of communication such as electronic mail or white board™ simultaneously while he is interacting with the live advisor.

The Data server 128 stores user input data and supplies the application Server 126. The data server 128 includes outside database sources from which the financial coaching system 102 can draw information such as actuarial data such as historical price data on securities from sources such as Reuters, user financial information such as banking and portfolio information in other financial institution, and market information such as the days closing numbers for various market indices as well as individual stock securities pricing information. Formatted in the Open File Exchange (OFX) format, now the accepted internet standard used by programs such as Quicken™ and MS Money™ the data server through the firewall can easily exchange information with the outside world and specifically the user. Furthermore, the coaching engine rules for various coaching engine may reside on the application server 126.

It should be noted that various computing platforms could be used to access the financial management system of the present invention. For example, a networked personal computer environment, a client-server system, a mainframe terminal environment, WEB TV terminal environment, dumb terminal environments can be used to access the financial management system of present invention. Depending upon the user's needs, a client-server system may be the most preferable computing system for implementing the financial system of the present invention. Furthermore, the representation of each server such as an application server or a data server is a logical representation. The actual physical systems may be distributed over many servers, or be included on a single machine.

Figure 3:
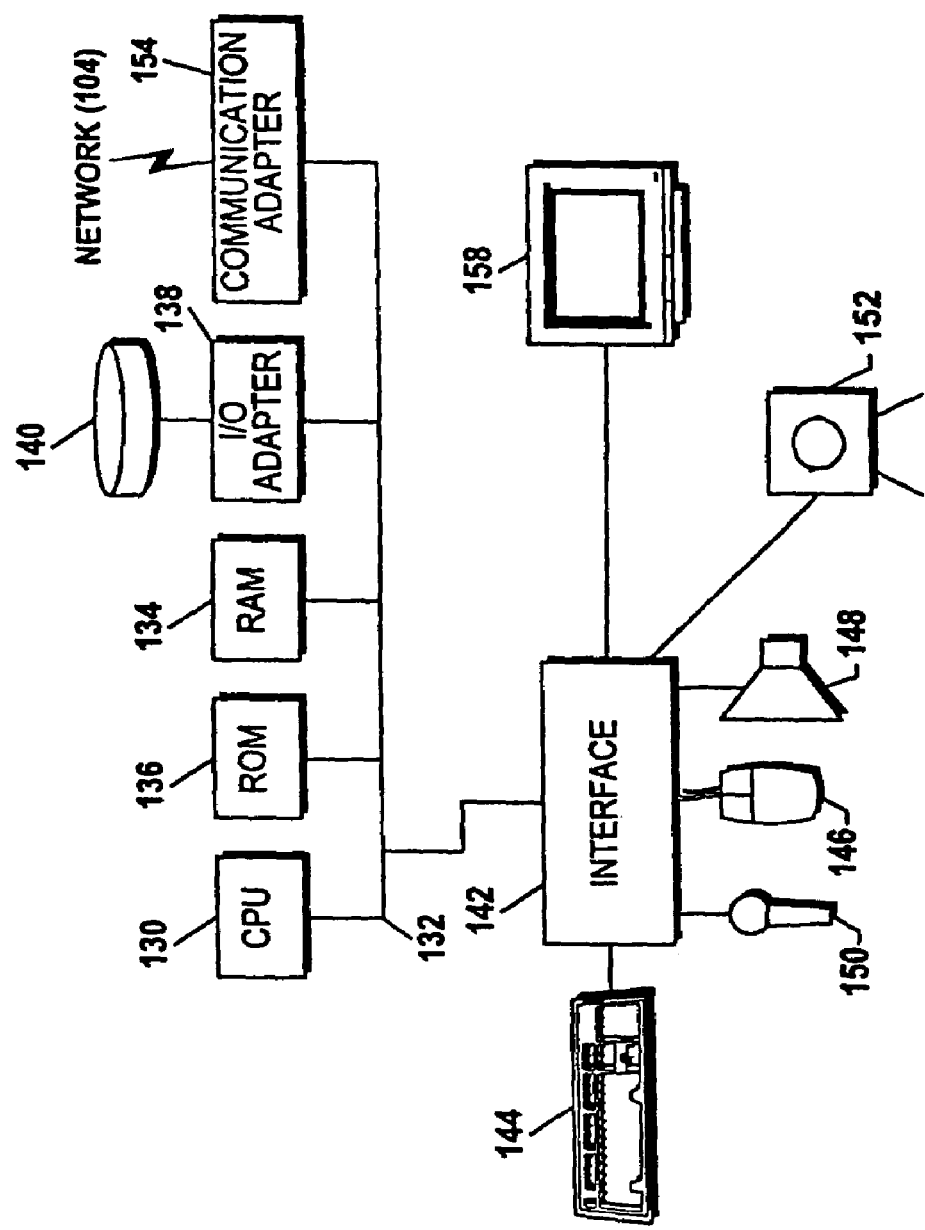
FIG. 3 is a block diagram of a representative hardware environment in accordance with a preferred embodiment.

FIG. 3 is a computer system architecture that can be used in implementing the present invention. This computer system architecture can be used to implement a user workstation, or any of the servers called for in FIG. 2. The present invention may be practiced on any of the personal computer platforms available in the market such as an IBM™ compatible personal computer, an Apple Macintosh™ computer or UNIX™ based workstation. The operating system environment necessary to practice the present invention can be based on Windows™, NT™, UNIX™, Apple Operating System™, or free operating system software such as Linux™ and Apache™. Furthermore, the computer system can support a number of processes. As appreciated by one skilled in the art, the processes may be written in any of the available programming languages including the newer object oriented programming languages such as Java™ or C++.

The computer system architecture of FIG. 3 comprises of a central processing unit 130, such as a microprocessor, a read only memory (ROM) 136, a random access memory (ROM) 134, an input and output adapter 138, a storage device 140, and interface 142 connecting a plurality of input and output device such as a keyboard 144, a mouse 146, a speaker 148, a microphone 150, a video camera 152 and a display 158, and a system bus interconnecting all the components together.

The computer may also include such devices as a touch screen (not shown) connected to the bus 132 and communication adapter 154 such as a dial up modem, a Digital Subscriber Line (DSL) modem or a cable modem, for connecting the workstation to a communication network 104 (e.g., the internet). The storage device 140 can be any number of devices including but not limited to hard disk drive, a floppy drive, CD-ROM, DVD, a tape device, or the newer removable storage devices such as a Jazz™ drive or ZIP™ drive.

Figure 4:
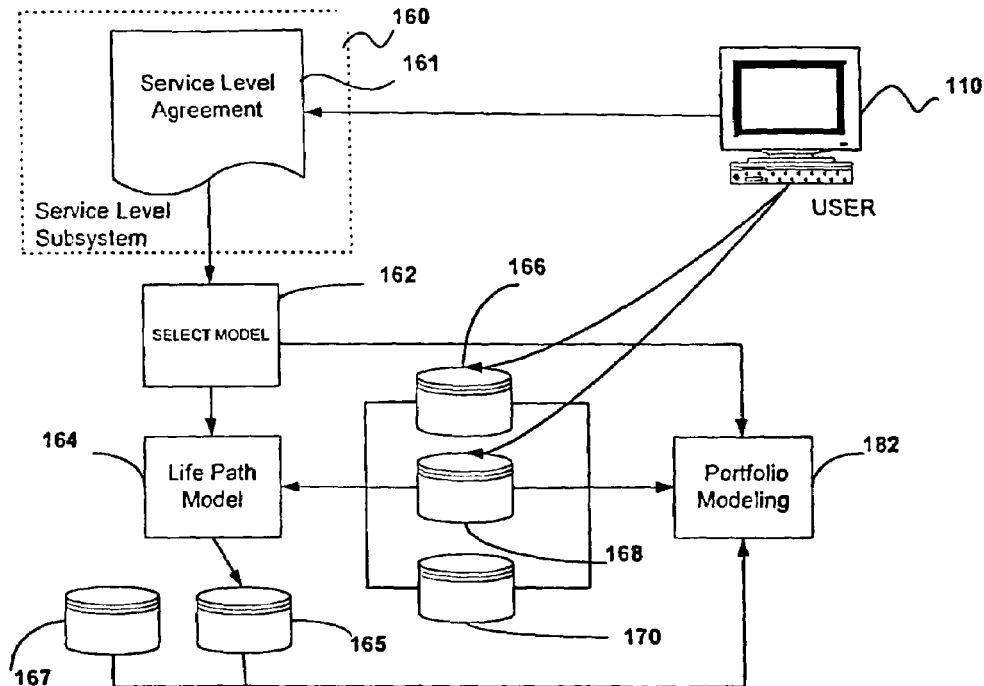
FIG. 4 is a block diagram of a financial management system.
Figure 17:
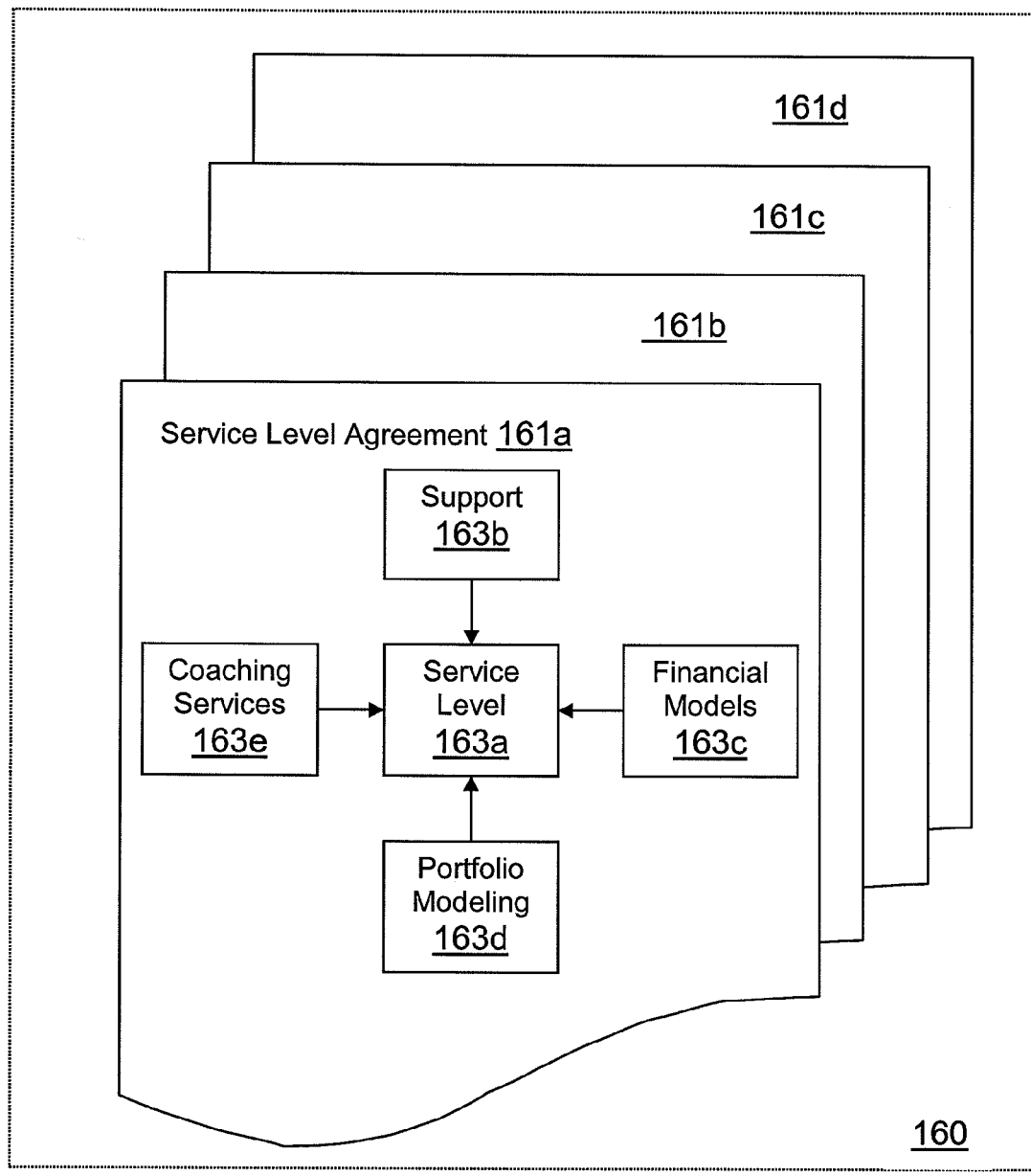
FIG. 17 is a block diagram of the service level subsystem.

FIG. 4 represents a block diagram of a financial Modeling System 102 of the present invention. A user would connect to the Financial Advisor system 102 using the wide area network 104. Once connected, the user has to input his login information and be authenticated by the firewall server. The user at a user terminal 110 enters the Financial Advisor system 102 at the service level subsystem 160. The service level agreement provides the level of services the user is entitled to. FIG. 17 represents a block diagram of the service level subsystem 160 in which service agreements 161a, 161b, 161c, or 161d provide various service levels related to portfolio modeling and coaching, each agreement with a service level 163a that defines a combination of support 163b, financial models 163c, portfolio modeling 163d, and coaching service 163e to the user. Once the user has negotiated a service level agreement 161, he is prompted to select the model to be used in operation 162. In one embodiment of the present invention, the level of service and support selected in the service level agreement 160 would control the user's access to different modeling tools.

In a preferred embodiment of the present invention the Lifepath model may be the hub of the financial institution's relationship. The LifePath model provides data to all coaching engine allowing customized coaching output to be dispensed to the user based on his unique financial situation. The Lifepath model combines all the pertinent financial information about a user in one coherent and comprehensive picture and models the user's life intentions into an aggregated cash flow system over a user selected period of time. Using the terminal 110 the user inputs his life intentions in terms of projected income and expenses. The Lifepath model 164 maintains an interactive dialog between the user and financial management system 100. The Lifepath model integrates the financial information available about the user in accordance with the user's service level agreement 160 to create an aggregate forecast of cash flow over the user's lifetime. The financial information available about the user includes the user's life intentions data 166 and the user's external financial data 168. In a preferred embodiment of the present invention, the user's external financial data can include current checking account information from the user's bank or data related the user's 401K plan. By incorporating external data 168 into the Lifepath model 164, the system is capable of dynamically analyzing the financial needs of the user and providing the user with an understanding of their financial health at any point with minimal input form the user. As discussed above, personalized service level agreement 160 can optionally allow the user to limit the system's and/or advisor's access to the user's external financial data 168.

Additionally, life path model 164 also integrates external market data 170 into the aggregated forecast of the user's cash flow. In one embodiment of the present invention, external market data 170 includes information such as current mortgage interest rates or market inflation rates. Access to both internal and external databases is controlled by the user's service level agreement.

The LifePath modeling tool 164 is further discussed in a related U.S. application named the A Financial Planning and Counseling System Projecting User Cash Flow, by the same inventors as the present invention, application Ser. No. 09/105,288, filed on the same day as the present application and incorporated herein by reference. Furthermore, the communication system described in FIG. 2 is further described in the related application titled Communication Interface For a Financial Modeling and Counseling System, application Ser. No. 09/705,290, by the same inventors as the present invention, filed on the same day as the present invention, and herein incorporated by reference. The automated coaching and live advising systems are further described in the related patents titled Financial Modeling and Counseling System, application Ser. No. 09/705,154 and Automated Coaching for a Financial Modeling and Counseling System, application Ser. No. 09/705,255, and A User Interface For a Financial Modeling System, application Ser. No. 09/704,838, all by the same inventors as the present invention, and all filed on the same day as the present application, and all of which are herein incorporated by reference.

Alternatively, the user may by pass the LifePath model and start with the portfolio modeling tool 182. The availability of the portfolio modeling tool is based on the user's service level agreement 161. The user would supply his financial portfolio information to the financial advising system 102, either directly using the user terminal 110 or indirectly through the wide area network 104, by accessing a multiplicity of databases 166, 168 and 170 and accessing information such as his securities portfolio at a particular brokerage firm. The financial portfolio modeling tool 182, is an interactive tool that has access to the all the information available to the Lifepath model 162, such as the user's life intentions data 166, the user's external financial data 168, as well as external market data 170. User insight data 167 and aggregated data from the Lifepath model 165 is also available to the portfolio modeling tool. As a result the user has little to input and may start using the portfolio model 182 very quickly without the need to do a lot of tedious data input. The financial portfolio modeling also allows the user to access a computer coach and/or a live advisor based in part on the service level agreement.

An alternative embodiment allows the user to go through the LifePath model 164 and set his long term financial goals and then using the portfolio modeling tool 182 the user would adjust his investment portfolio to better achieve his long term financial goals.

Coaching generating subsystem 172 comprises one or more advice or coaching engines 174. Coaching engine 174 dynamically analyzes the financial needs of the user in accordance with the user's service level agreement. Furthermore, the coaching engine 174 is configured to operate with rules repository 176. Rules repository 176 is a collection of rules-based business logic that produces clear automated advice. Rules repository 176 generates its advice using LifePath data 165 and user insight data 167. Alternatively the investment portfolio data from the portfolio modeling tool 182 triggers the coaching engines advise. In one embodiment of the invention, user insight data 167 includes transaction history, product or purchase history, as well as demographic information about the user.

In addition to providing sound coaching to the user, coaching generating subsystem 172 also recommends product solutions to the user. As an example, in one embodiment of the present invention, the coaching engine 174 can recommend that the user include deposit products and loan products in their financial plan. For example, the coaching engine 174 can recommend that the user acquire a certain mortgage or bridge financing. Similarly, the coaching engine 174 can also direct the user to the need for financial products such as, home improvement, line of credit, or credit card products. Coaching engine 174 can also have access to product information from various financial institutions (not shown). Accordingly, the user can request additional information about the various products recommended by the system.

The user can access their financial plan or life path model using user terminal 110. User terminal 110 is part of collaborative computing environment 178 and is in data communication with virtual coach 180 and the advisor terminal 106 through communications network 104. In one embodiment of the present invention, communication network 104 is the Internet.

The coaching and product solutions generated by the coaching generating subsystem 172 are presented to the user through virtual coach 180. Virtual coach 180 presents the product recommendation with accompanying rationale. The user may or may not wish to contact the dedicated financial advisor for additional advice or information. Because the system generates reasoned financial coaching in accordance with the user's financial needs and intentions, the financial advisor is able to operate more productively. Furthermore, the user can test different scenarios by altering the data captured by life path model 164. Each scenario can then be analyzed by coaching engine 174. The virtual coach 180 is further described in the related U.S. application named Automated Coaching System, application Ser. No. 09/705,255, by the same inventors, filed on the same day as the present application and incorporated herein by reference In addition to virtual coach 180, the user can optionally interact with a dedicated financial advisor 106 through communications network 104.

In one embodiment of the present invention, financial advisor 106 is located in a call center 118 on a relationship manager's workstation 125. Financial advisor 106 can interact with user 110 using various multimedia interaction tools, for example, still-shot images or video streaming. Accordingly, the user is able to buttress the coaching received from virtual coach 180 with advice from a dedicated financial advisor operating at terminal 106. In many situations, the live advisor's input may be necessary, since he brings a level of expertise and experience no automated coaching system may match. However, since the automated coaching has framed the problem for the user and the live advisor, both can immediately start analyzing alternative solutions in a focused and more cost efficient fashion.

Depending on the level of service the user has negotiated with the service level agreement 161, he may have a multiplicity of modeling tools available in the financial management system. In alternative embodiments of the present invention, modeling tools for analyzing various financial instruments such as bonds, reverse mortgages, option contracts and a like may be available to the user.

Figure 5:
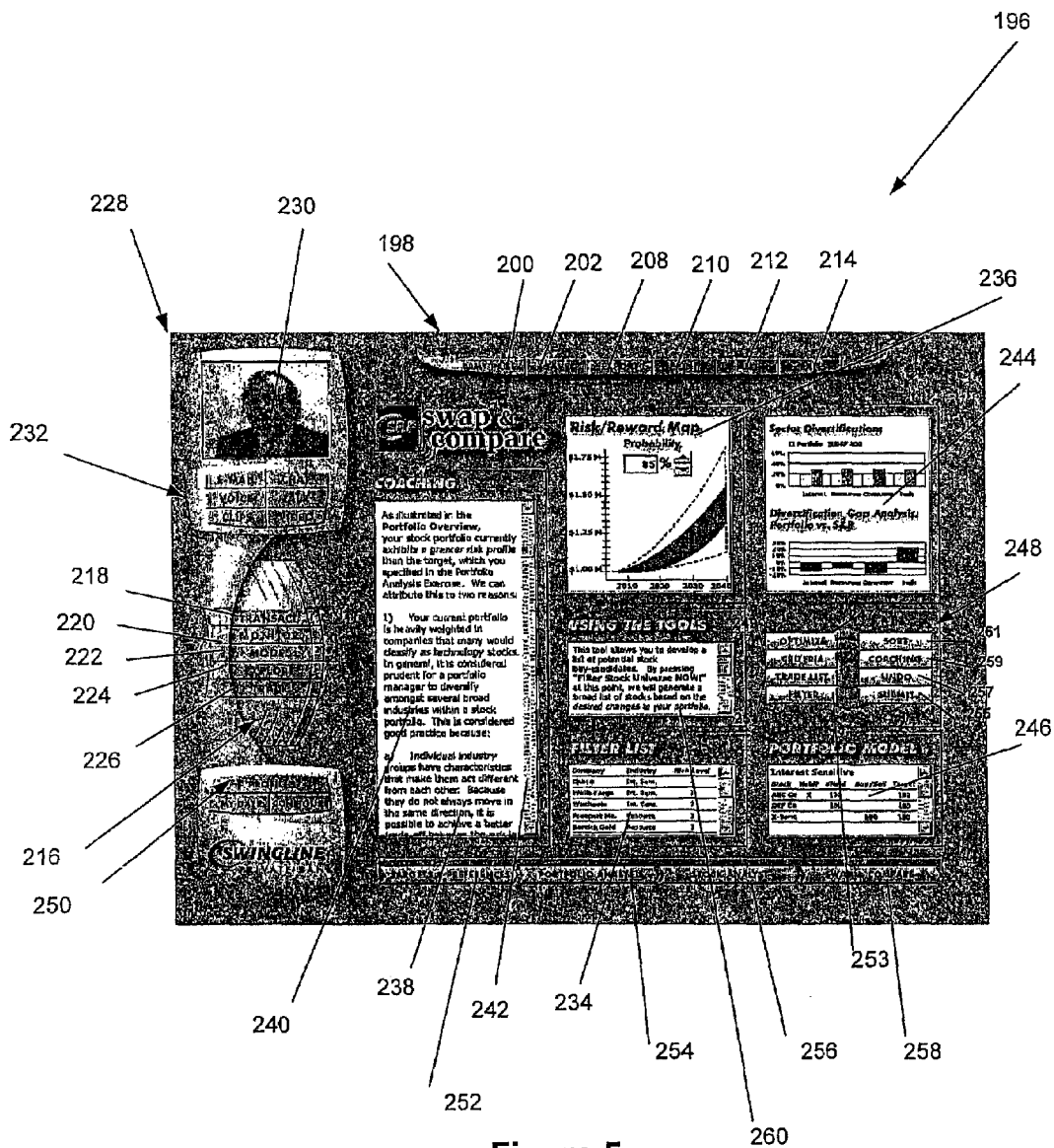
FIG. 5 is an illustration of a investment portfolio generator web page interface.

FIG. 5 is an exemplary graphical user interface 196 that embodies the various concepts and methods set forth for financial portfolio modeling. As shown, the graphical user interface 196 includes a plurality of fundamental selection icons 198 including a my page icon 200 for displaying a graphical user interface specifically tailored for a particular user, a save icon 202 for saving any changes made to the graphical user interface 196, an export icon 208 for exporting data displayed by the graphical user interface 196, a print icon 210 for printing various fields of the graphical user interface 196, a help icon 212 for obtaining help information, and an exit icon 214 for exiting the graphical user interface 196.

My page icon 200 displays a web page that can be customized to each user's need, simplifying the use of the portfolio model 182. In one embodiment of the present invention, the portfolio modeling system uses the Open File Exchange (OFX) protocol which has become the standard protocol for the exchange of financial information over a wide area network, and particularly the Internet. Thus exported data from the portfolio modeling system into other financial programs is formatted to be easily usable by these programs.

Further displayed on the graphical user interface 196 is a plurality of mode icons 216 for initiating various modes of operation. The mode icons 216 include a transact icon 218 for initiating transactions involving the purchasing and selling of investments utilizing a network, a monitor icon 220 for monitoring the performance of the investments, a model icon 222 for generating an investment model based on criteria entered by the user, an explore icon 224 for retrieving information on the investments, and a track icon 226 for tracking the investments utilizing the network. In the preferred embodiment of the present invention, the Wide Area Network 104 is the Internet and the portfolio modeling system has access to outside databases such as Reuters and Bloomberg for historical and current securities pricing or market indexes.

With continuing reference to FIG. 5, a communication medium 228 may be employed to converse with other users, namely financial advisers, etc. Such communication medium 228 includes a window 230, and a plurality of communications icons 232 that enable various types of communication between the user and the live coach or advisor. Such communications icons 232 include an e-mail icon, a chat icon, a voice icon, a talk icon, a clips icon, and a video icon. The mail server 116 and call center 118 allow the user to contact the advisor by email or telephone call. The mail server further supports live chat and voice over the network as well as a collaborative medium such as a White Board™. Depending on the bandwidth available to the user, he may receive still pictures or live streaming video of the advisor, or he may see an animation.

The incorporation of the various communication technologies and programs within the context of a financial advising system is further described in a related application titled Communication Interface for a Financial Modeling and Counseling System, application Ser. No. 09/705,290, by the same inventors as the present application, filed on the same day, and incorporated herein by reference. Also, the graphical user interface of FIG. 5 is further described in the U.S. related application by the same inventors, titled A User Interface for a Financial Modeling System, application Ser. No. 09/704,838, both filed on the same day as the present invention and both herein incorporated by reference.

A filtering field 234 is also shown in FIG. 5. Such filtering field 234 includes a plurality of companies and associated risk levels and industries which are displayed in accordance with the user's appropriate tolerance to risk and investment style. A risk/reward map 236 is also shown displaying the probability of the user reaching its financial goals. Also shown is a coaching window 238 for displaying coaching strings 240 based on a rule-based automated coaching engine. Such window 238 may include a field adjustment bar 242 in order to facilitate viewing of the coaching strings 240.

Further features associated with the graphical user interface for the portfolio modeling 182 include an information window 244 which illustrates various charts pertaining to sector diversification and other investment parameters. A portfolio model window 246 may also be displayed for portfolio modeling purposes. It should be noted that the various services provided by the present invention might be initiated by selecting corresponding service icons 248. The optimize icon 247 optimizes a securities list based on the newly specified criteria. The criteria icon 249 enables the user to introduce additional criteria for selecting a particular security. The trade list 251 displays the system recommended securities that should be sold based on the user criteria and his personal financial parameters. The filter icon 253 generates a filtered list of securities displayed in the filtered list window 234. Sort icon 261 sorts the list of securities based on a user selected criteria such as alphabetical order. The coaching icon 259 generates context sensitive coaching related to the user's financial portfolio. The undo icon 257 undoes a specific swap of securities. The submit icon 255 submits and the user changes to his portfolio during the current session.

Further, a profile may be viewed and adjusted using a plurality of profile icons 250. This ease of use helps the user to feel comfortable with the system and trusting of it, allowing him to take full advantage of the all the integrated features of the system.

The user can set a target goal for his investment portfolio as well as his preferences by selecting the target and preference icon 252. He may do an analysis on his past or present portfolio by selecting the portfolio analysis icon 254. He may trigger specific coaching on specific a security or group of securities or even on whole industry sectors, as well as request more detail information by selecting the stock analyst icon 256. He may further model and analyze the effect of inclusion or exclusion of particular securities on his portfolio by swapping stocks in and out of the portfolio 258. When selecting a particular icon corresponding to the various tools, a corresponding help text string appears in the help screen 260, directing the user on how to use the particular tool.

Figure 6:
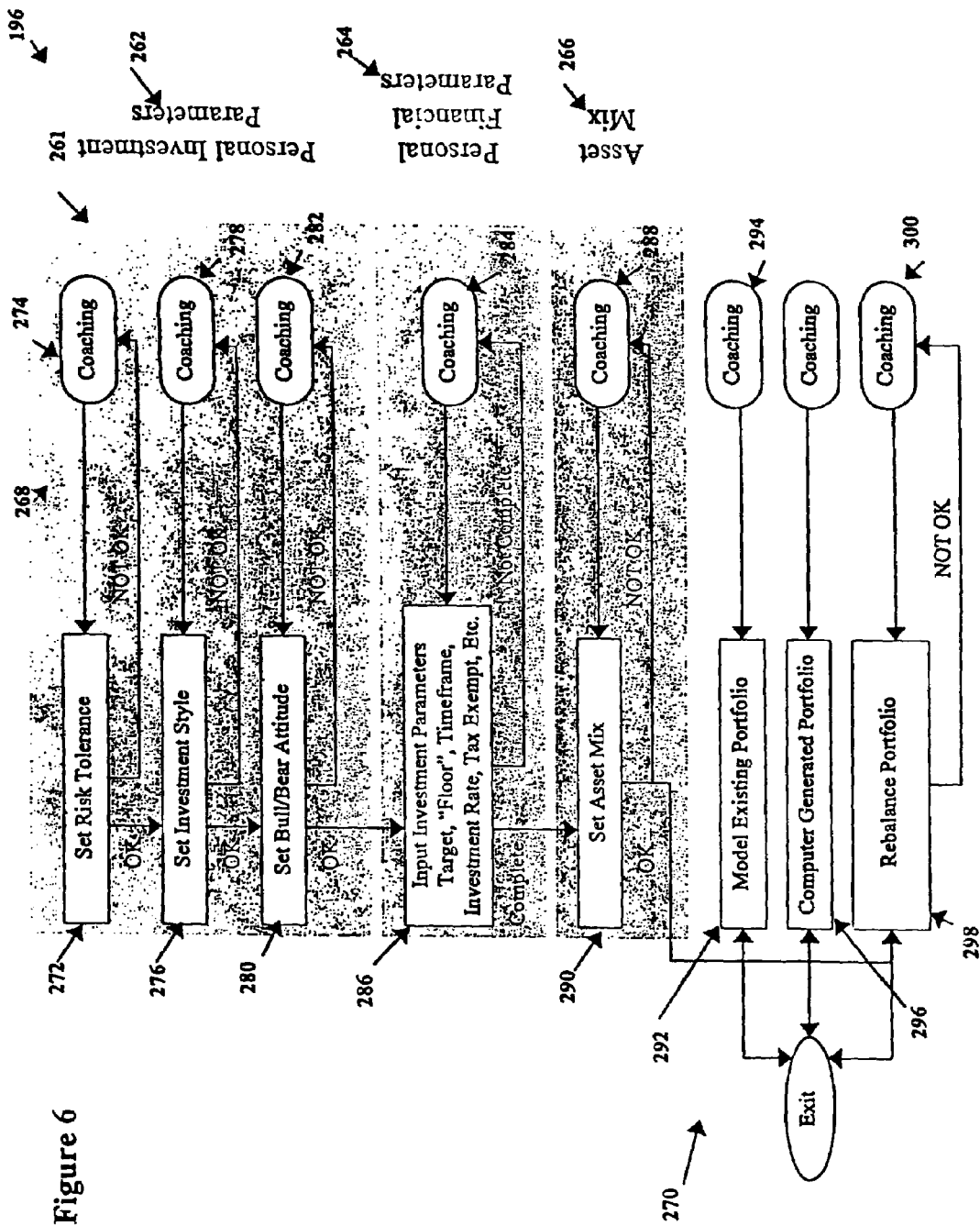
FIG. 6 is a flow diagram of an operation of the Investment Portfolio generator in accordance with a preferred embodiment.

FIG. 6 illustrates an investment portfolio management method utilizing a coaching engine in a network based financial framework. First, in operation 261, a plurality of parameters is set for a subject utilizing a network. The parameters include personal investment parameters 262, personal financial parameters 264, and/or asset mix parameters 266. Such parameters may include a minimum retirement, target floor, investment rate, tax implications, etc. In operation, the parameters may be selected manually by the subject using a desired graphic user interface, or by a third party.

Next, the network is utilized to provide the subject coaching from an investment coaching engine in operations 268, where such coaching relates to the setting of the parameters. The coaching may be provided by utilizing a look-up table which is capable of generating various combinations of advice based on the settings. In the alternative, the advice may be generated using any other type of artificial intelligence system.

At least one financial model for a portfolio of the subject is subsequently generated in operation 270 based on the setting of the parameters. This may be generated using a system similar to that which generates the coaching, or any other desired means. The network is again used to provide coaching from the investment coach engine to the subject with the coaching relating to the generated financial model.

As shown in FIG. 6, the personal investment parameters include a risk tolerance parameter 272. Further, the coaching by the coaching engine 274 may provide a textual risk tolerance profile for the subject based upon an interpretation of current risk tolerance parameters of the subject as textual analysis.

Further, the personal investment parameters may include an investment style parameter 276. In such embodiment, the coaching by the coaching engine 278 provides a textual investment style profile for the subject based upon an interpretation of current investing style parameters of the subject as textual analysis.

Furthermore, in yet another embodiment of the present invention, the personal investment parameters include a bull/bear attitude parameter 270. In the present embodiment, coaching by the related coaching engine 272 provides a textual description of an implied future of financial markets and graphs showing forecast curves of financial markets based upon the building of financial market forecasts which are, in turn, based upon evaluations from financial experts.

In one embodiment, the coaching by the coaching engine 274 relating to the setting of the personal financial parameters in operation 262 provides an alert if the investment parameters of the subject conflict with Lifepath cash flows or personal parameters based on a consistency check of the investment parameters with data obtained from a Lifepath model and personal investment parameters.

With continuing reference to FIG. 6, the coaching by the coaching engine 288 relating to the setting of the asset mix parameters in operation 290 provides a rationalization of the asset mix based on personal and financial parameters of the subject and at least one computer generated asset mix. No penny stocks would be included if the subject is conservative, only treasury bills. A pie chart may also be included that represents a portfolio showing the subject's assets.

In still another embodiment, the financial model comprises a model of an existing investment portfolio of the subject. Note operation 292. The coaching by the coaching engine 294 provides an analysis of market-related growth by security and sector, trend analysis, fee and service analysis, and/or dividend and interest impact based upon transaction history and current market values of the existing investment portfolio. The coaching by the coaching engine 294 may also provide an analysis of growth, risk and value of the existing investment portfolio based on market data and expert analyst opinion.

Still yet, the coaching by the coaching engine 294 may provide an evaluation of the existing investment portfolio relative to the personal and financial parameters of the subject based on a comparison of growth and volatility projected forecasts to the personal and financial parameters of the subject. It should be noted that similar capabilities may be provided using a model based on a computer generated portfolio in operation 296.

In operation 298, the financial model may include a model of an investment portfolio of the subject generated by the subject with the input of a private banker. Coaching by the coaching engine 300 provides an analysis of growth, risk and value of each security in the investment portfolio based on a concatenated, user-friendly English format of market data and expert analyst opinion obtained utilizing the network 104.

Further, the coaching by the coaching engine 300 may provide an evaluation of the contributions of securities in the investment portfolio relative to the personal and financial parameters of the subject based on a comparison of the personal and financial parameters of the subject to an analysis of risk compliance, growth, and volatility.

The first wave of customers of online discount brokerage customers have been characterized by sophisticated investment knowledge and confidence in acting as integrators of their own financial lives. They have established their own balance between risk and reward. Most of today's typical investors, typically know relatively little about the technicalities of investing.

In one embodiment of the present invention, a financial risk management system may include traditional fundamental/technical data and analyst interpretation. Much of this is meaningless to the average investor however. The present invention's approach meets their information and learning requirements in these ways. First it develops detailed profiles of the user's investment personality and customizes all information such as coaching to the user profile. Second the system uses coaching engines to translate fundamental and technical data into natural language textual coaching string outputs, customized to the user. Furthermore, the financial modeling and counseling system alerts the user to investment activities which are incompliant with his personal investment parameters such as his risk tolerance, investment style and so on . . . The financial modeling and counseling system further provides automated coaching throughout the investment process.

Risk tolerance, investment style and financial outlook are established through a series of interactive multimedia-based scenarios which unfold online. These exercises provide immediate coaching feedback to the user. The results are stored as a multidimensional profile which is used by modeling and coaching activities throughout the portfolio management process.

Figure 7:
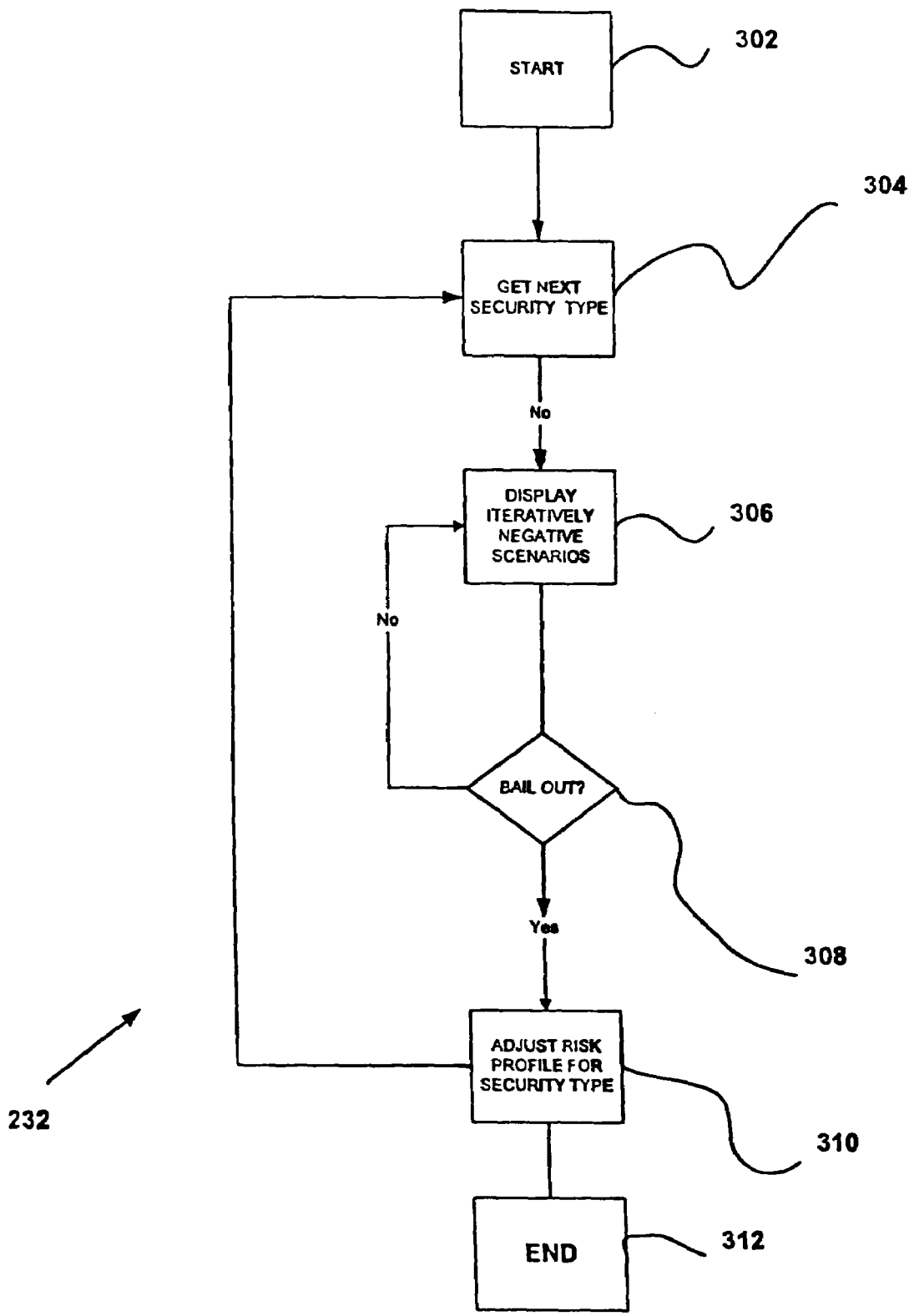
FIG. 7 is a flow diagram of how to set risk tolerance.

FIG. 7 is a flow diagram illustrating the set risk tolerance operation 232 in greater detail. The user starts 302 this process by selecting the profile icon 250. The user is prompted for the security type to be used for risk profiling 304. Next, a negative financial scenario is presented to the user and he is asked if he wants to bail out once confronted with this negative scenario 306. The negative scenarios presented to the user are generated by the coaching engine 274 and may include scenarios such as negative news related to a particular security and the company's future growth or performance and profitability. Faced with this situation, the user may decide to hold on to the particular security or sell and bail out. In one embodiment of the present invention the representations may include both textual and graphical representation, and may further include headline news indirectly related to the particular company. Alternatively, the scenario generated may encompass as whole sector or industry such as the interest sensitive construction industry. Both indirect economic news such as a forecast of future interest rate and direct economic news such as declining housing starts or sales of new homes are presented to the user and his reaction to the negative news is indicative of his personal risk tolerance. If the user selects to bail out 308 based on the negative financial scenario, his risk tolerance profile is adjusted accordingly 310. If the user refuses to bail out, he is confronted with an iteratively more negative market scenarios 306 scenario and again he has the option to again bail out 308. Depending on when the user selects to bail out 308, the system adjusts the user risk profile for that security type 310. The process is repeated for other types of investment such as Retirement, Tax deferred environment.

The user reaches the end 312 of this process after the system has determined his risk tolerance for each investment type. Alternatively, the user's risk tolerance level can be set manually by a third person such as the live advisor or even possibly by the user himself. The average unsophisticated user does not know about his risk tolerance level.

The present invention provides risk management and reporting capabilities for personal investment portfolios of stocks and bonds. The present invention allows customers to be able to quantify the risk associated with their equity holdings for the first time. Currently risk management for personal portfolios is based on judgment and gut feel. The brokerage industry is currently facing a number of challenges and opportunities related to this. Too many optimistic self-directed investors are assuming levels of risk they are not aware of and cannot afford. As well, regulators are concerned about the lack of controls in the trading environment potentially resulting in widespread losses and liability litigation.

Currently, risk management is a vague area which advisors and clients typically address using judgment and intuition. Advisors and brokerage firms need to quantify risk to mitigate legal liability. In addition, investors want to quantify the impact of individual picks on their portfolio risk/reward. Further, regulators will be supportive of processes that help investors to become more knowledgeable about risk and avoid unaffordable losses. Finally, the brokerage industry needs to outsource risk management services to avoid any additional technology problems and to ensure third party objectivity.

Many investors build their own spreadsheets to understand their portfolio performance. The present invention provides new tools to benchmark portfolio performance and set a new industry standard for reporting and analysis.

Figure 8:
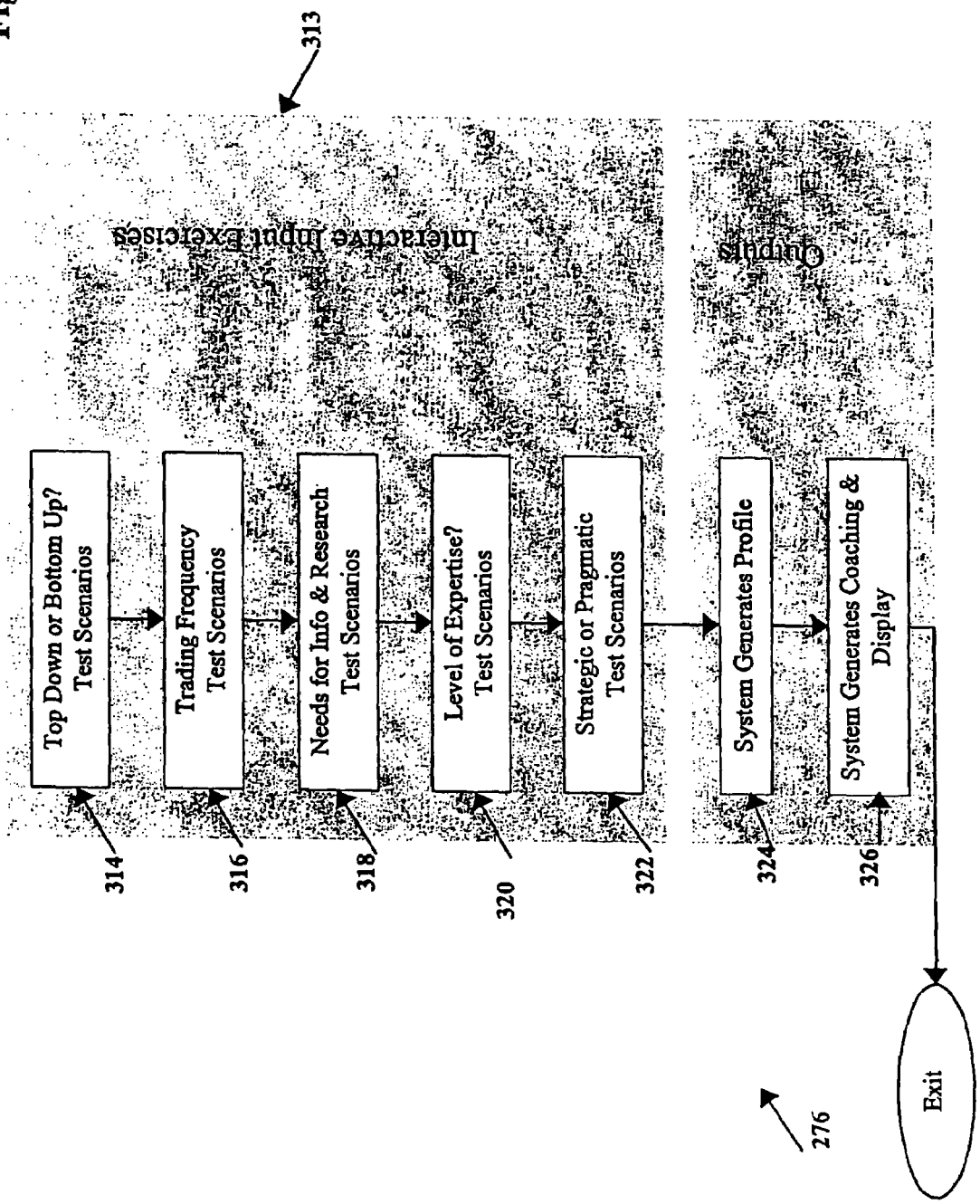
FIG. 8 is a flow diagram of how to set investment style.

FIG. 8 illustrates a flow diagram for determining an investment style in a network-based financial framework. The present technique is intended to not just ask questions, but provide scenarios. It sets up a portfolio of stocks that an investor can trade or not trade on these fictitious stocks, and provides examples of how the stock market can move. The present method develops a profile and helps target information effectively for the particular person. Coaching is strategically designed to keep the risk minimal by avoiding telling what someone should do. Scenarios will also identify areas of weakness in one's knowledge.

In one embodiment, the interactive input exercise may include top down or bottom up test scenarios 314, trading frequency test scenarios 316, needs for information and research test scenarios 318, level of expertise test scenarios 320, and/or strategic or pragmatic test scenarios 382. For example, a bottom up investor would start with a vision of the economy and decide what to invest in, and then they would look at one stock at a time and make a decision. Trading frequency is used by the system to project the user's portfolio performance in the future by taking into account trading cost. Level of expertise scenarios may be used to customize coaching strings and the level of explanation put forth by the automated coaching.

In use, an investment profile of the subject is generated based on the at least one interactive input exercise in operation 324. Coaching is also provided for the subject based on the generated investment profile. A display may be generated for the subject based on the generated investment profile. Note operation 326. In one embodiment of the present invention, the user may reject his investment style parameter as presented to him by the automated coaching and go through the process 276 to reset his investment style parameter.

Figure 9:
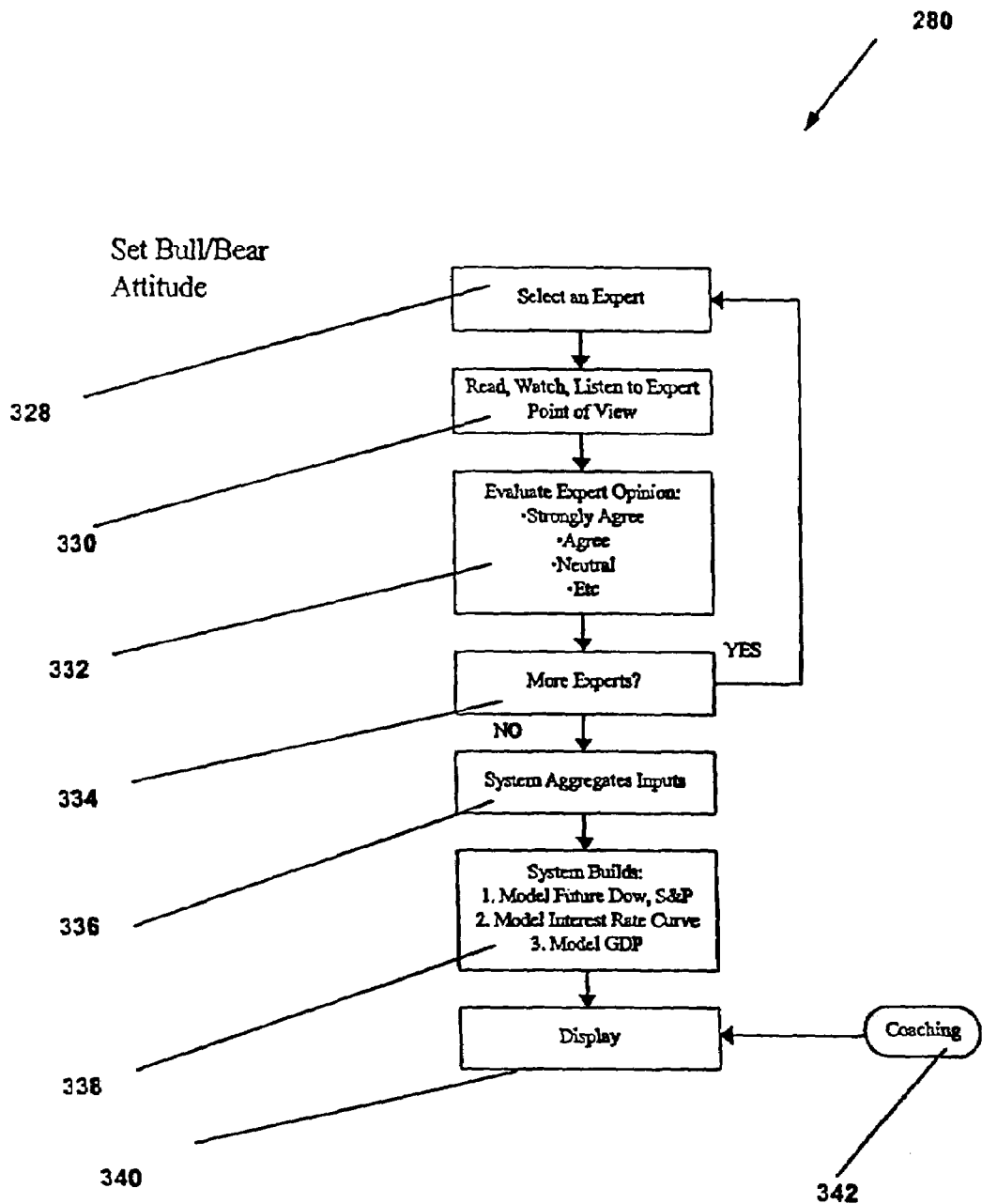
FIG. 9 is a flow diagram of how to set Bull/Bear attitude operation in greater detail.

FIG. 9 illustrates a flow diagram for the "set Bull/Bear attitude" in operation 280. The instant aspect of the present invention is able to come to a conclusion about a person. For example, it may determine how confident a person is about the future. Online polling is one technique that allows the present invention to become the basis of a customer's long-term parameters. It achieves a systematic attempt to capture one's perspective on the economy as a whole. First, an expert is selected utilizing a network in operation 328.

Next, an opinion from the expert is rendered utilizing the network and witnessed in operation 330. At least one evaluation of the expert's opinion is then received from a subject utilizing the network. Note operation 332. As an option, the step of obtaining the evaluation may be accomplished by displaying to the subject a plurality of choices for expressing the subject's agreement with the opinion of the expert, receiving a selection of one of the choices from the subject utilizing the network, and storing the selection. In one aspect of the present invention, the plurality of choices displayed to the user may include the following: strongly agree with the opinion, agree with the opinion, neutral to the opinion, disagree with the opinion, and/or strongly disagree with the opinion.

In operation 334, the subject may be permitted to select at least one other expert utilizing the network after which operations 328-332 of the present invention may be repeated. The evaluation(s) may then be aggregated from one or more subjects, as indicated in operation 336.

Thereafter, in operation 338, at least one financial model is built based on the aggregated evaluation from the subject. As an option, the financial model may be selected from a model based on the future of a financial index, a model based on an interest rate curve, and a model based on a gross domestic product (GDP). Further, the financial model is displayed in operation 340 utilizing the network. In one aspect of the present invention, the subject may be coached utilizing the network. See operation 342. Such coaching may be based on the financial model.

Once personal investment parameters have been identified, the user is prompted to input some basic personal financial parameters 264. Unlike the Personal Investment Parameters, which are largely qualitative, the Personal Financial Parameters are quantitative. They may include, initial and target values of the portfolio, the user's investment time frame, and whether the portfolio is a tax exempt IRA, 401K or Canadian RRSP.

One important datum is the "floor." In a retirement portfolio this would be the bare minimum acceptable lifestyle the customer would be prepared to accept. The risk model used for analysis projects the portfolio value forward compounded at its current rate of growth. Surrounding the forecast line there are risk bands showing best and worst case scenarios given the aggregated volatility of all contained securities. The bands are preferably defined for example, by Bell curve theory and represent a sigma value related to the confidence level the customer requires in the forecast. The greater the confidence required, the wider the bands. If the "floor" value ends up within the bands, the customer is at risk of an unacceptable retirement. The customer can settle for less confidence in the portfolio projection. He may also optimize a portfolio that hits the target with lower risk using the automated coaching to guide him. He may further accept a lower target at lower risk and rebalance his portfolio. He may simply lower his "floor" or decide to increase his contribution. Once the user's personal investment parameters and user's personal financial parameters have been established, the system sets the asset mix 266.

The following data model shows the data sources and how the data is being used within the system.

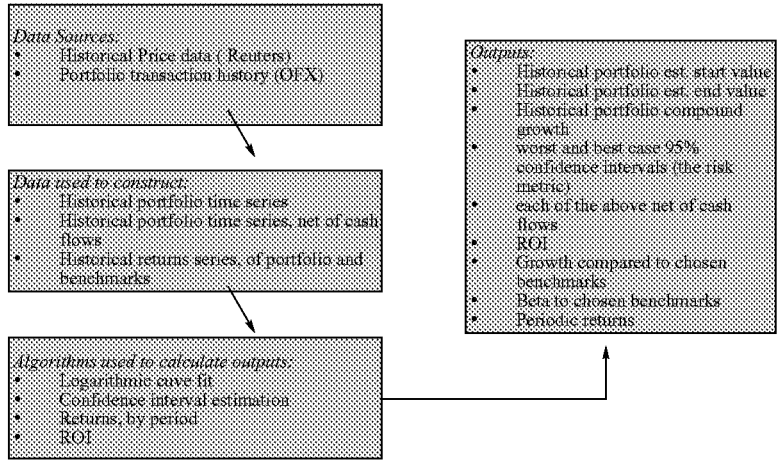

The present invention uses an interactive model where various data sources are accessed through a wide area network such as the internet and the user does not have to feed to the system as much data manually. In an embodiment of the present invention, the risk modeling system may access external data sources supplying data for some of the risk/reward calculations in risk management system such as historical security pricing data from a source like Reuters, historical transaction data from the customer's brokerage, manual input by the customer, and some other file type, e.g. Quicken™ and MS Money™. Reuters data includes time series updated to Close from the previous day, adjusted for stock splits, comma delimited flat files, or other format of choice relating to up to 500 million stocks, bonds, mutual funds, derivatives, etc. These files are formatted in OFX, the Open File Exchange format, now the accepted Internet standard which is the same format used by Quicken™, MS Money™, etc.

Figure 10:
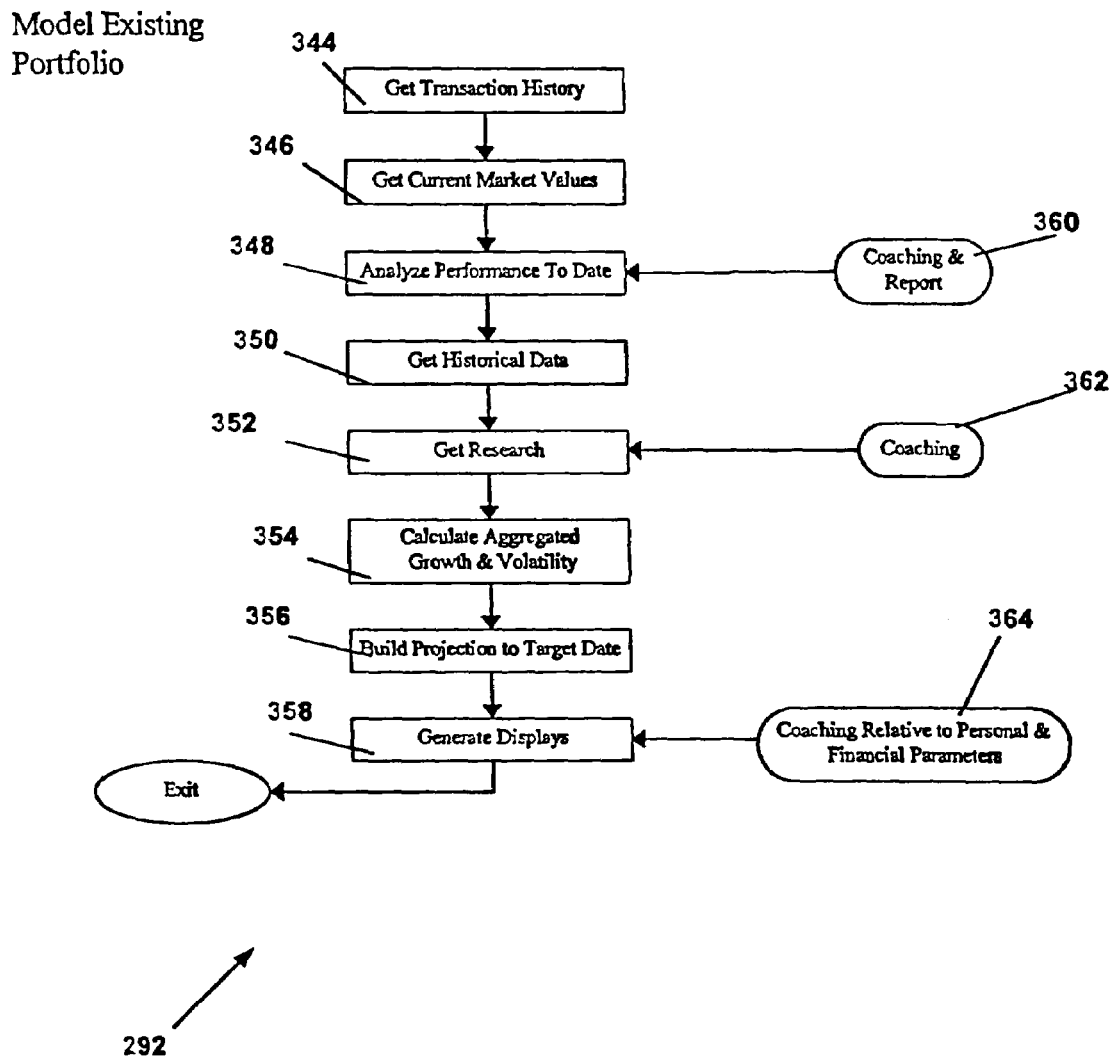
FIG. 10 is a flow diagram of how to model an existing portfolio.

FIG. 10 illustrates a flow diagram for modeling an existing financial portfolio 292. First, the performance of at least one investment of a subject is determined utilizing a network. As shown, the performance of the investment includes obtaining a transaction history of the investment in operation 344, obtaining a current market value for the investment in operation 346, and analyzing the performance of the investment based on the transaction history and the current market value of the investment. Note operation 348.

Next, financial information is obtained relating to the investment of the subject. The step of obtaining the financial information relating to the investment may include obtaining historical data on the investment in operation 350, and obtaining research relating to the historical data of the investment in operation 352.

With continuing reference to FIG. 10, the aggregated growth and volatility of the investment is calculated in operation 354. Such calculation may be performed based on bell curves, and other statistical techniques. Best case and worst case scenarios may also be produced.

A projection to a target date is subsequently built for the investment. Note operation 356. This is done based on the determined performance of the investment, the financial information relating to the investment, and/or the calculated aggregated grown and volatility of the investment. Finally, displays are generated based on the built projection. Note operation 358.

As shown in FIG. 10, coaching and a report 360 may be provided to the subject utilizing the network based on the determined performance of the investment. Further, coaching may be provided to the subject utilizing the network based on the obtained financial information relating to the investment. Note operation 362. Such network may also be used to provide coaching in operation 364 with the generated displays relative to personal and financial parameters of the subject.

Figure 11:
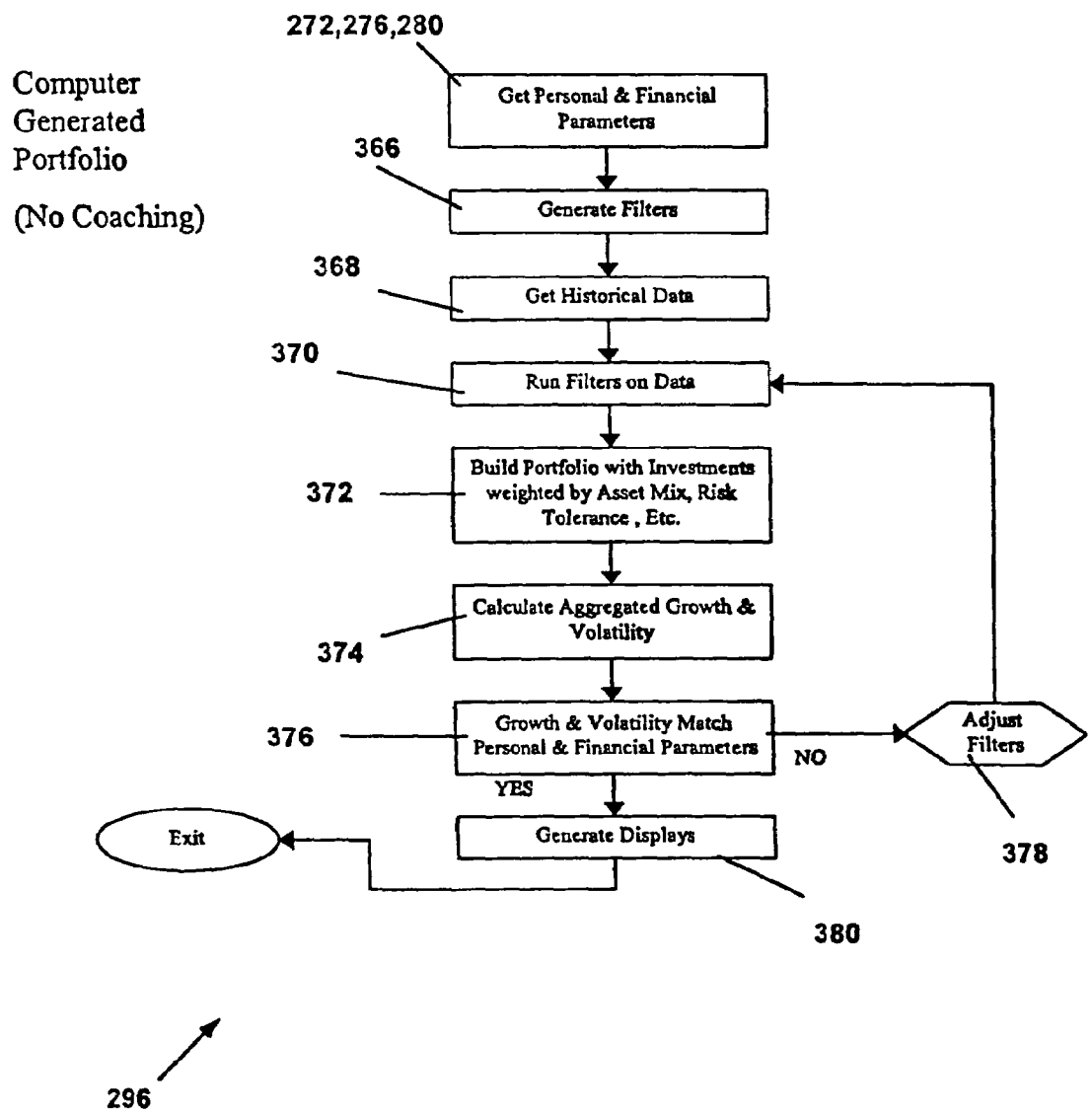
FIG. 11 is a flow diagram of how to build a computer generated portfolio.

FIG. 11 is a flowchart illustrating a method for automated portfolio generation 296 utilizing a network. Three powerful portfolio tools use the personal and financial profile parameters as inputs. A tool may be used to create a customized portfolio automatically. It may create an ideal proportional breakdown of security types based on the customer's personal and financial investment parameters. Having created a set of filters, it may then select appropriate securities of each type at the right level of risk and volatility, validate the aggregated growth and volatility, and iterate if necessary. This risk modeling tool may be used by the user or by the live advisor to on the customer's behalf. The risk modeling sub-system allows to automatically analyze an existing portfolio, or to swap stocks in and out of the portfolio with automated coaching or the live advisor's help.

First, in operation 272, 276 & 280, financial information is received from a subject utilizing a network. In one embodiment of the present invention, the financial information of the subject includes personal investment parameters and/or financial parameters of the subject.

Filters are then generated based on the received information of the subject in operation 366. Thereafter, historical data is obtained on investments utilizing the network. Note operation 368. The historical data on investments is then filtered in operation 370 with the generated filters. Using the filtered data, a financial portfolio may then be generated for the subject in operation 372. Further, the filtered data may be weighted by an asset mix and/or risk tolerance of the subject.

Figure 12:
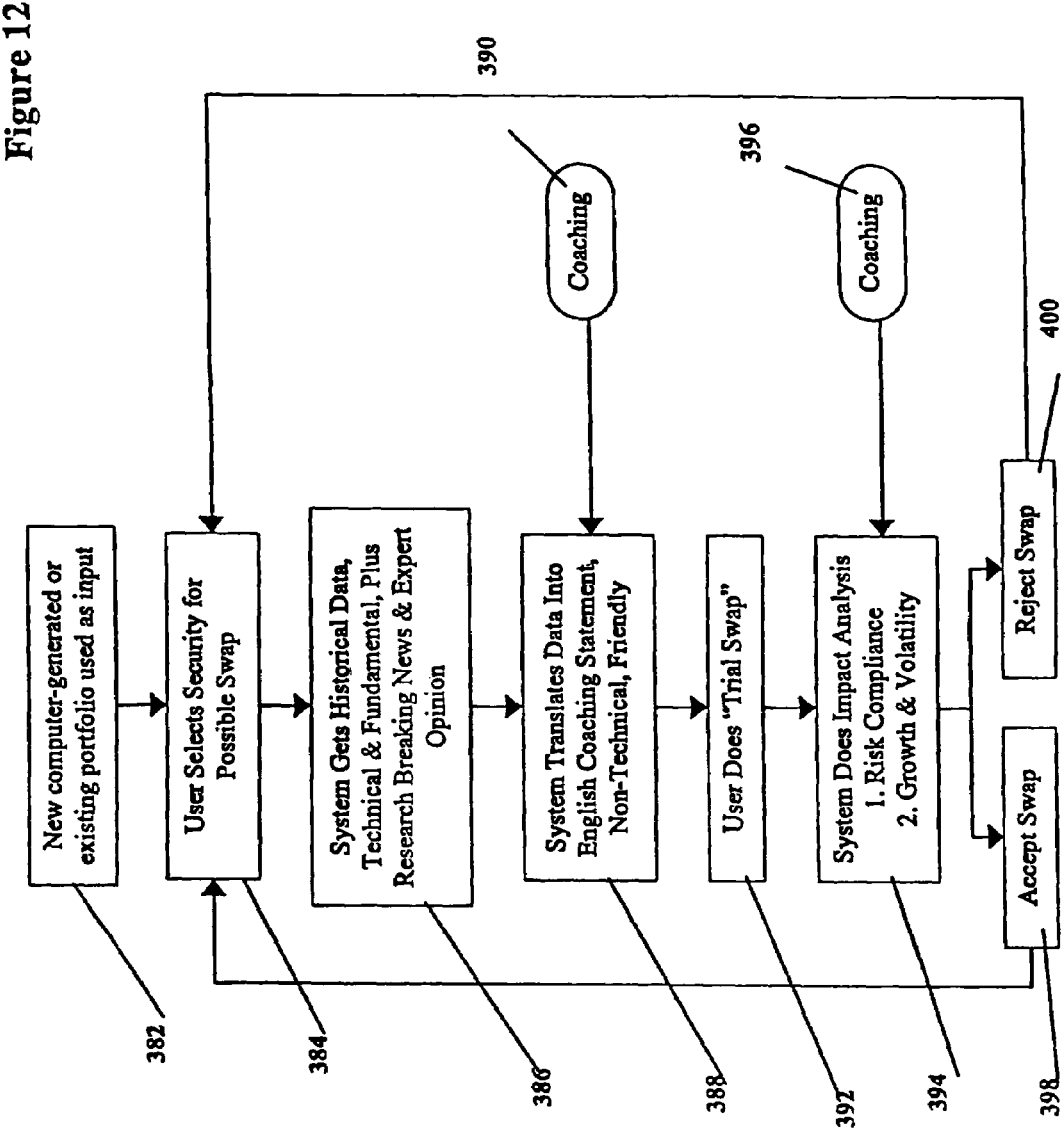
FIG. 12 is a flow diagram of how to rebalance a portfolio.

In operation 374 shown in FIG. 12, aggregated growth and volatility may be calculated based on the built financial portfolio. Further, it may be determined whether the aggregated growth and volatility match the financial information of the subject. Note operation 376. When it is determined in decision 378 that the aggregated growth and volatility fail to match the financial information of the subject, the filters may be adjusted. Such filters are adjusted until the aggregated growth and volatility match the financial information of the subject. Finally, in operation 380, displays are generated based on the built financial portfolio.

Figure 15:
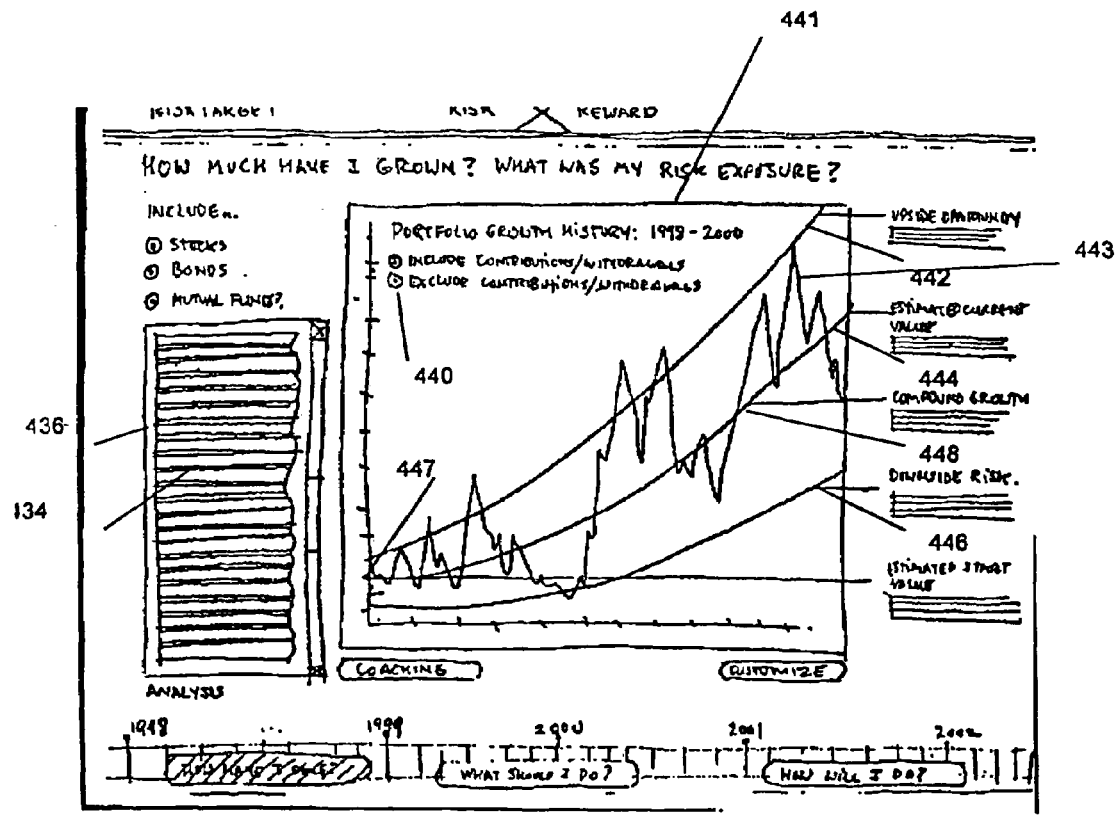
FIG. 15 is an illustration of a risk exposure up to the present graph web page interface.

FIG. 15 illustrates a flow diagram of the process to rebalance a portfolio 298 with the aid of the automated coaching. In the first step the modeling system creates a portfolio model using either an existing portfolio or starts with a computer generated portfolio 382. Next the user selects security from the list of filtered securities for possible "swap" or exchange with securities already in the portfolio 384. The securities are filtered based on the user's personal investment parameters 262 and the user personal financial parameters 264. For example, securities with higher Value At Risk coefficient than the permissible user risk tolerance are rejected. Securities are selected from user preferred industry sectors such as electronics or transportation. The system obtains historical data, technical and fundamental data, and research and breaking news or expert opinion, all pertaining to the particular security 386. The coaching engine converts the data into natural language, non technical coaching strings 390. Automated coaching provides analyses of the technical and fundamental data and provides growth, risk and value analysis for each security selected 388.

After the automated coaching output, the user may elect to do a "trial swap" of the security and observe the impact of the swap 392. The modeling system recalculates the portfolio model including the added securities and the subtracted securities. The system further does a risk compliance to meet the with the user's personal investment profile 394. Furthermore, the new portfolio's growth and volatility are analyzed by the system and the automated coaching engine translates the effect of the swap on the portfolio performance in non technical natural language 396. If the user is satisfied with the resulting swap he may accept it 398. If he is unsatisfied with the security swap, he may reject it 400. In one embodiment of the present invention, the user may place an order to purchase the particular security through the financial modeling system, using the network.

The portfolio generation tools can be used to model and analyze a past or present portfolio. Most investment questions are addressed by analyzing the performance of the investor portfolio and using sophisticated analysis tools. Table 1 below illustrates an exemplary historical portfolio analysis in accordance with one embodiment of the present invention.

TABLE 1

| Investor's Basic Issues | System Calculates | Comments |
| --- | --- | --- |
| How can I get a snapshot of my portfolio growth? | Growth curve with graphical display | The graphic shows the mean estimated initial value of the portfolio, the mean estimated final value and the growth curve connecting them |
| What was my portfolio worth at the beginning of the period? | Starting mean estimated portfolio valuation | Portfolio fluctuations make it hard to distinguish signal from noise. The growth curve runs right down the central axis of the volatility movements. Its end points represent estimated mean initial and current values |
| What was my portfolio worth at the end of the period? | Ending mean estimated portfolio valuation | (See above) |
| What kind of growth have I been achieving with my current investment strategy? | Compound growth factor | Current strategy includes choice of securities as well as timing and volume of investment. Historical growth factor includes growth due to both market changes and investor capital flows. It is calculated as a gross geometric average percentage change per period |
| Is there some way of measuring my risk exposure? | Value at Risk | "On average, you have been exposed to a 5% chance of losing $8000 on any given trading day." Computation to use variance/covariance method in a historical simulation |

TABLE 1-continued

| Investor's Basic Issues | System Calculates | Comments |
|---|---|---|
| How do I know whether this level of risk is high or low? | VaR compare to VaR of user selected benchmark indexes and/or securities | |
| How does my portfolio reflect changes in the market? | Beta relative to chosen benchmarks | "Your portfolio tends to track strongly in the same direction as the NASDAQ 500, but its upward and downward movements are more extreme. You have recently tracked in a direction opposite to the DOW." |
| Which of the securities in my portfolio are the strong contributors to overall growth? | Net present contribution of each security to current growth | A list of strong and weak performers: a breakout of securities by compound growth |
| How does each security contribute to overall risk? | Beta analysis of equities and mutual funds relative to portfolio. Equivalent analysis for bonds | "Stock X is quite volatile, but tends to move in a direction opposite to the rest of your portfolio. For this reason, it tends to reduce overall risk." |
| What is my return on investment? | ROI: Based on gross cumulative investment Compared to equivalent cash flows into riskless Gov't. Bonds Net yield compared to riskless bonds | In a historical portfolio investors can find it hard to discriminate between the performance of the underlying securities and the impact of moving moneys in and out. This analysis calculates growth net of investment flows. It compares portfolio growth to the net present value of the cash flows at the beginning of the period in question. They are also compared to equivalent flows into a riskless bond. And the difference between actual and riskless gains is calculated. This allows calculation of the risk premium |
| How are the different sectors of my portfolio contributing to growth and risk? | Yield and volatility breakdown by sector | |
| What is my tax exposure? | Capital gains and other taxable exposure | |

In another embodiment of the current invention, the financial risk management system performs a risk/reward analysis of a current financial portfolio. Table 2 below illustrates an exemplary current portfolio analysis in accordance with one embodiment of the present invention.

TABLE 2

| | | |
|---|---|---|
| How can I get a snapshot of my portfolio growth? | Back test current portfolio over required period. Develop compound growth coefficient | Growth curve would be calculated, but not displayed. It would be used to develop the compound growth factor as well as the estimated current mean valuation |
| What is my portfolio worth now? | Ending mean estimated portfolio valuation | (See above) |
| Is there some way of measuring my risk exposure? | Value at Risk (VaR) | "On average, you are now been exposed to a 5% chance of losing $8000 on any given trading day." Computation to use variance/covariance method in a back-tested historical simulation of current positions |
| How do I know whether this level of risk is high or low? | VaR compare to VaR of user selected benchmark indexes and/or securities | |
| How does my portfolio reflect changes in the market? | Beta relative to chosen benchmarks | "Your portfolio may trend to track strongly in the same direction as the NASDAQ 500, but its upward and downward movements are more extreme. You may track in a direction opposite to the DOW." |
| Which of the securities in my portfolio are the strong contributors to overall growth? | Net present contribution of each security to current growth | A list of strong and weak performers: a breakout of securities by compound growth |
| How does each security contribute to overall risk? | Beta analysis of equities and mutual funds relative to portfolio. Equivalent analysis for bonds | "Stock X is quite volatile, but tends to move in a direction opposite to the rest of your portfolio. For this reason, it tends to reduce overall risk." |
| How are the different sectors of my portfolio contributing to growth and risk? | Yield and volatility breakdown by sector | |
| How does my historical portfolio performance compare to expected performance of my current portfolio? | Comparison and contrast of volatility compound growth, etc., variously broken down | |

The present invention provides risk management and reporting capabilities for personal investment portfolios of stocks and bonds. The present invention allows customers to be able to quantify the risk associated with their equity holdings for the first time.

Most investors do not understand the likelihood of reaching their investment goals, and what picks they should be making to increase their chances of success. Clients want to understand both historical performance and possible future performance in order to improve decision-making. The present invention can address both, with or without advisor support, allowing the business to meet the aggressive growth expectations the market values highly.

Many investors build their own spreadsheets to understand their portfolio performance. The present invention provides new tools to benchmark portfolio performance and set a new industry standard for reporting and analysis.

Preferably, the present invention is available 24 hours a day, seven days a week and requires no human intervention. Moreover, the present invention can inform clients about risk using plain language and simple graphic representations. This broadens the target audience to include all investors.

In one embodiment of the present invention, the historical positions of the investments of the user are retrieved from a database. In another embodiment, the historical analysis of the investments includes a calculation of a mean at endpoints of the historical analysis.

In one aspect of the present invention, capital gains taxable exposure may be determined based on the historical analysis. Optionally, a compound growth factor may be determined based on the historical analysis. Also optionally, a Value at Risk may be determined based on the historical analysis utilizing a variance method computation. The Value at Risk may also be determined based on the historical analysis utilizing a covariance method computation.

Figure 13:
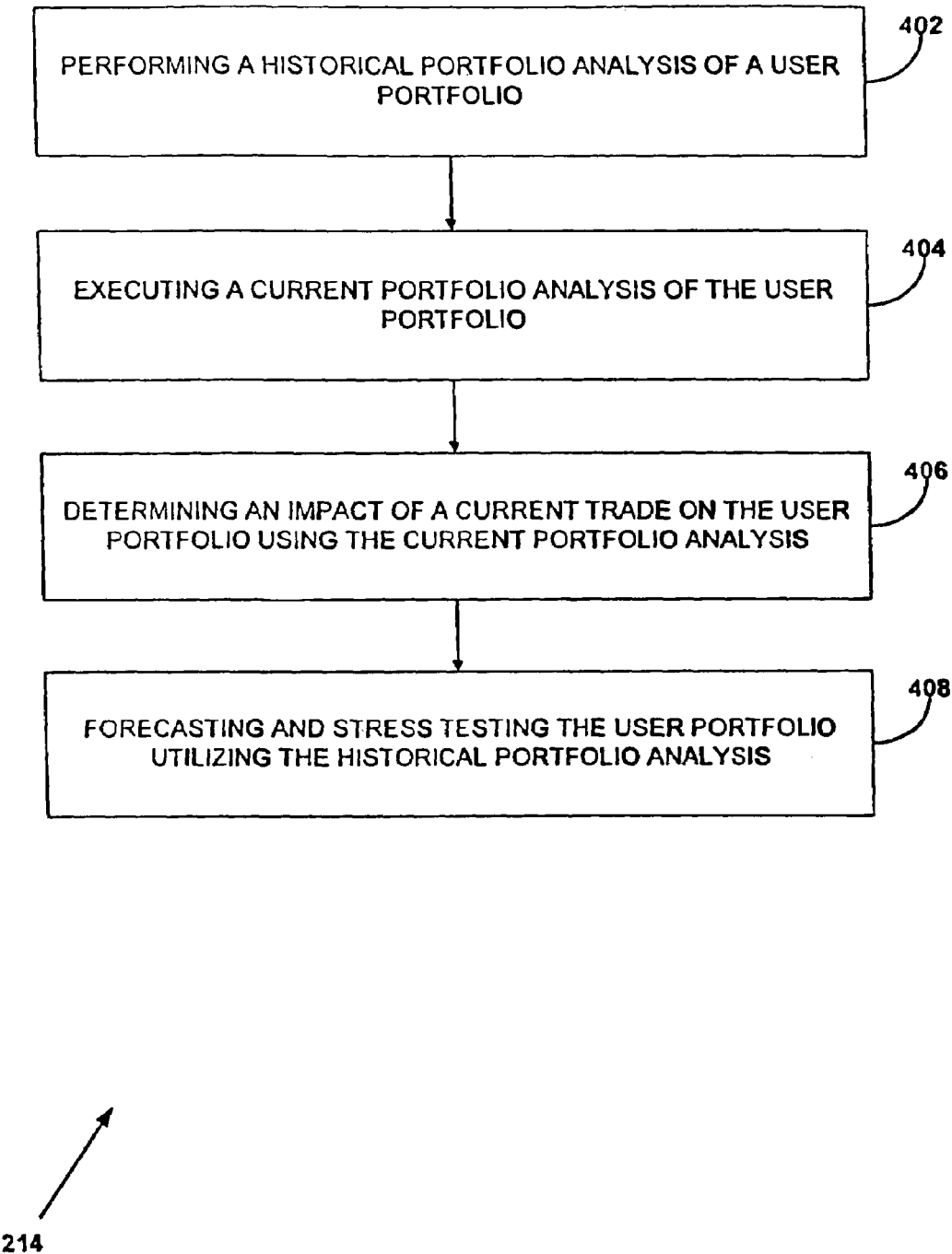
FIG. 13 is a flow diagram of portfolio analysis steps.

FIG. 13 is a flowchart illustrating a method for performing risk and reward analysis in accordance with one possible embodiment of the present invention. First, in operation 402 a historical portfolio analysis of a user portfolio is performed. Then, in operation 404, a current portfolio analysis of the user portfolio is executed. An impact of a current trade on the user portfolio is then determined using the current portfolio analysis as indicated in operation 406. Finally, the user portfolio is forecasted and stress tested utilizing the historical portfolio analysis. See operation 408.

An efficient portfolio can deliver a required level of growth for the least possible risk. Two ways to achieve this are to rebalance a portfolio to favor lower risk stocks which deliver appropriate growth, if they exist. Another is to favor securities with appropriate growth whose volatilities move typically in opposite directions to the portfolio.

To manage risk in this way, the present invention provides the investor with two needed capabilities: a filter to identify candidate securities, and a tool to quantify the risk/reward impact of a given security transaction on the portfolio.

Trade impact analysis is conducted when the user swaps at least one security for another and the model recalculates the impact of the swap on the various indices.

In one embodiment of the present invention, the selected securities characteristics include a growth coefficient. Optionally, the selected securities characteristics may include a correlation to selected indexes to overall portfolio. Also optionally, the selected securities characteristics may include a ratio of sigma to mean portfolio valuation.

In one aspect of the present invention, the selected portfolio characteristics may include portfolio growth. Additionally, the selected portfolio characteristics may include Value at Risk. Further, the selected portfolio characteristics may include a Beta. Table 3 below illustrates an exemplary current trade impact analysis in accordance with one embodiment of the present invention.

In another embodiment of the present invention, the forecast and stress analysis is generated by projecting a current position forward using a compound growth factor. Optionally, the forecast and stress analysis may be generated by projecting a current value of the current positions forward using a volatility from a historical portfolio analysis. Also optionally, the forecast and stress analysis may be generated by applying compound growth and volatility using back-tested parameters to determine a future portfolio value.

In one aspect of the present invention, the forecast and stress analysis is generated by representing growth as an annuity with regular contributions to determine a further portfolio value. Additionally, a future portfolio value when future markets are different from past markets may be determined.

Given the current value, growth factor and standard deviation of the current portfolio, it is possible to project a value for any time in the reasonable near future. This can be presented graphically and alphanumerically. However, this is only valid assuming that both underlying market conditions and business performance of public firms do not significantly change.

There are many ways to couch this forecast in a more realistic perspective. One may pick a few of the bearish scenarios currently considered by analysts: emergent inflation, divergence of old and new economies, etc., and model their impacts in selected stress tests. Table 4 below illustrates an exemplary forecasting and stress testing analysis in accordance with one embodiment of the present invention.

TABLE 4

| Investor's Basic Issues | System Calculates | Comments |
| --- | --- | --- |
| What will my portfolio be worth if I continue my current pattern of investment activities? | System projects current value of portfolio forward using the compound growth factor and volatility from historical portfolio analysis. It also calculates best and worst case using 95% confidence intervals. | The investor's historical pattern of activities include:<br>1. Timing and selection of trades<br>2. Frequency of trades<br>3. Rate of investment into the portfolio<br>4. Performance of selected securities in the market<br>5. Cost of trades<br>Growth and volatility calculations for the historical portfolio will be impacted by all of these. So the forecast based on history will test the performance of the entire combination of factors |

TABLE 3

| | | |
| --- | --- | --- |
| How will a change in my positions impact risk and reward? | Growth, VaR and volatility impact of each proposed trade, both absolute and relative to user-selected benchmarks | Once the starting portfolio has been aggregated, it can be treated as a single security. The proposed trade, therefore, entails a simple, two-element variance/covariance analysis |
| How do I know which securities to use for a desired risk/reward impact? | System filters list of securities based factors including:<br>1. positive Beta to portfolio (increased risk)<br>2. negative Beta (decreased risk)<br>3. compound growth coefficient | Modern Portfolio Theory emphasizes that two volatile stocks within a portfolio can offset each other's volatility if they typically move in opposite directions. This hedging strategy has been difficult for retail investors. This will be the first commercial filter to emphasize not just the magnitude of a security's Beta but its direction compared to the Beta of the portfolio |

TABLE 4-continued

| Investor's Basic Issues | System Calculates | Comments |
|---|---|---|
| What would my portfolio be worth if I: 1. let it alone 2. grew it evenly by a regular monthly amount | These projection would be based on back-tested parameters of the current portfolio. This would filter out the effect of: 1. Trading frequency 2. Cost of trades 3. Capital inflows/outflows The first question is answered by applying compound growth and volatility using the back-tested parameters. The second is answered by treating growth as an annuity with regular contributions | Many investors achieve less than optimal results by over-trading. They buy high and sell low, reacting to the morning news on impulse. They also lower their profitability through bloated trading costs. These two calculations allows the investor to compare the previous forecasts which include their trading practices to the current forecasts which do not. The second forecast treats their current portfolio as if it were a mutual fund in which they were dollar cost averaging. |
| What if future markets are different from the past? | Stress-test calculations could model some simple scenarios which would affect the entire portfolio: 1. One or more serious corrections at random times during the forecast interval 2. Long-term declines in overall compound growth 3. Combinations of the above The scenarios could be based on the fears and concerns that are current in the market at any given moment. For example, current fears include: 1. An inflationary cycle of unknown duration 2. A long-term divergence of old and new economy stocks 3. A collapse of over-valued Internet stocks 4. Etc. If Algorithmics methodologies were available, this is where a Mark-to-Future model would be useful | Most investment advisors are reluctant to provide forecasts based on historical growth for well-known reasons. Each of the forecasts in the rows above assume the future will unfold like the past. These stress tests are designed to create the appropriate sense of caution in the investor's mind. |

Figure 14:
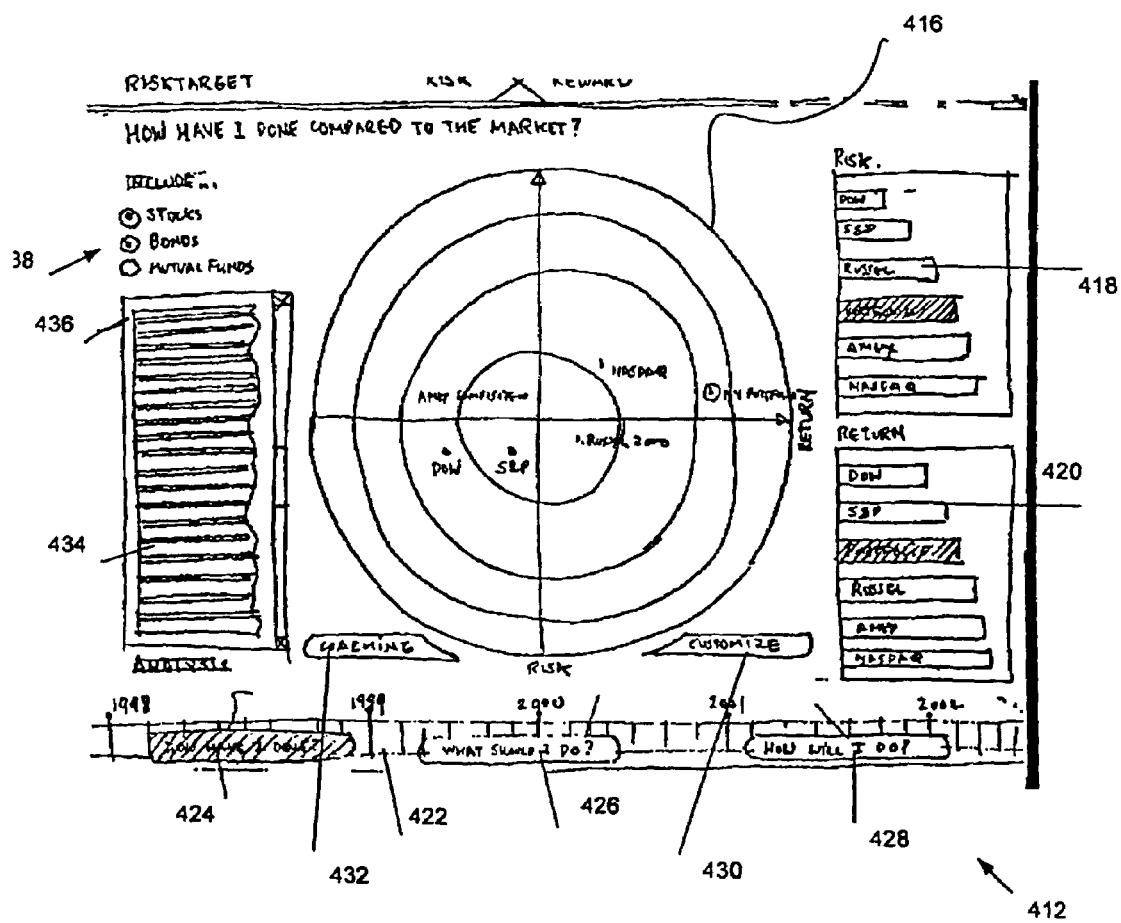
FIG. 14 is an illustration of a risk target graph web page interface.

FIG. 14 is an exemplary graphical user interface that embodies the many systems and methods set forth in a risk management and modeling system. As shown, the graphical user interface 412 includes a display icon where the user's portfolio is graphically compared to some user selected market indices on a risk/return graph 416. Various user selected market indices are also shown simultaneously on the same graph, making a comparison simple and intuitive. A graphical risk representation of the user's portfolio and market indices are also displayed as a bar graph 418. The user portfolio's return is compared in a bar graph format as well 420. Time 422 is represented in a liner form in the lower portion of the graphical user interface. Further displayed on the graphical user interface 412 is a plurality of mode icons for initiating various modes of operation. By selecting the icon "How Have I Done?" 424, a graphical representation of the user's past performance as compared to the market is calculated and displayed. Similarly, selection of "How will I do?" icon 428, will result in the display of a projection of the user's portfolio as compared to the rest of the market. Another icon "What should I do" 426 would display the result of user making some security swapping to better conform the user's portfolio to the user's profile. Selection of "customize icon" 430 would allow the user to change the market indices displayed on the various graphs. The "coaching" icon 432 would trigger interactive coaching by displaying related coaching strings 434 in the coaching window 436. The user selects to display all or part of his portfolio by using the selection icons 438.

It is not easy to determine how well a portfolio has performed. Typically, investors compare the closing valuation of one period against a previous period, say, one year or one quarter. So often investors may believe that they are up 60% over the previous year. However, this is seriously misleading. If, for example, the end of the end period value reflects a temporary upswing and the start period value represents a brief downturn, the overall growth pattern can be dramatically overestimated.

There are many better approaches to portfolio valuation and marginal accuracy is typically gained by increased computational complexity. However, a simple, robust approach is to fit an exponential growth curve to the data. It is intuitively obvious that the curve passes through the 'center' of the data. This makes it easy for the investor to interpret the curve as the 'signal' that underlies the 'noise.' The two end points of the plot are reasonable proxies for mean portfolio values at each point in time. The compound growth factor in the curve is a good proxy for realized compound growth. The calculation algorithm is simple and uncontroversial.

The investor need not understand any of the math or the theory. This should be completely invisible. The simple idea is that the security or portfolio in question is likely to over- or under-perform the risk bands about 1 time in 20. For any moment in time, the investor can be shown that there has been 1 chance in 20 of portfolio gains being greater than X or losses greater than Y.

The three lines representing central tendency and upper/lower confidence intervals are easy to understand and interpret on the fly. Absolute risk can be measured by expressing standard deviation as a fraction of the central tendency. This can easily be presented on a scale. Relative risk can be measured by comparing this statistic to similar ones for indexes like the DOW, S&P. etc.

In one embodiment of the present invention, the current positions of the investments of the user may be retrieved from a database. In another embodiment, the current analysis of the investments includes a calculation of a mean at endpoints of the current analysis. In yet a further embodiment, the current positions may be back tested over a predetermined time period.

In one aspect of the present invention, a Value at Risk may be determined based on the current analysis utilizing a variance method computation. Optionally, a Beta may be determined and compared relative to selected benchmarks for the current positions.

FIG. 15 is another embodiment of the graphical user interface 412. The graphical window 441 displays portfolio growth history over a user selected time period. The graphical representation may include or exclude user contributions and withdrawals by selecting the appropriate icon 440. The actual movement of the user's portfolio is represented by the graph 443. The graphical window 441 displays on the same graph the upside opportunity 442, the estimated current value 444, and the down side risk 444 and the estimated start value 447. Compound growth is also indicated based on the portfolio's past performance and user inputs 448. Interactive coaching displays appropriate coaching strings 434 in the coaching window 436.

The portfolio history is computed in the following manner:
The number of units of a security at time t is the difference between the sum of units bought and sum of units sold in all previous transactions
The position of a security is the number of units times the price at time t
The portfolio value at time t is the sum of all positions
The portfolio history is the time series of portfolio values for t=start value to end value The history includes positive and negative growth due to:
  Changes in the values of securities
  In and outflows of capital The portfolio history is:
  stored as a vector of values
  displayed as a line graph.

Most investors do not understand the likelihood of reaching their investment goals, and what picks they should be making to increase their chances of success. Clients want to understand both historical performance and possible future performance in order to improve decision-making. The present invention can address both, with or without advisor support, allowing the business to meet the aggressive growth expectations the market values highly.

The present invention helps to build a common language, metrics and tools to quantify risk so that the investing public can proactively manage it. The present invention provides a rigorous process for managing personal portfolio risk.

Preferably, the present invention is available 24 hours a day, seven days a week and requires no human intervention. Moreover, the present invention can inform clients about risk using plain language and simple graphic representations. This broadens the target audience to include all investors.

Of the various kinds of risk a private investor must face, market volatility is central. This can be measured in terms of the amount of fluctuation a security or portfolio exhibits around a measure of central tendency. Taking the growth curve as the central tendency, volatility risk can be characterized by the familiar two standard deviation bands 442 and 446 representing 95% of measured variation.

Figure 16:
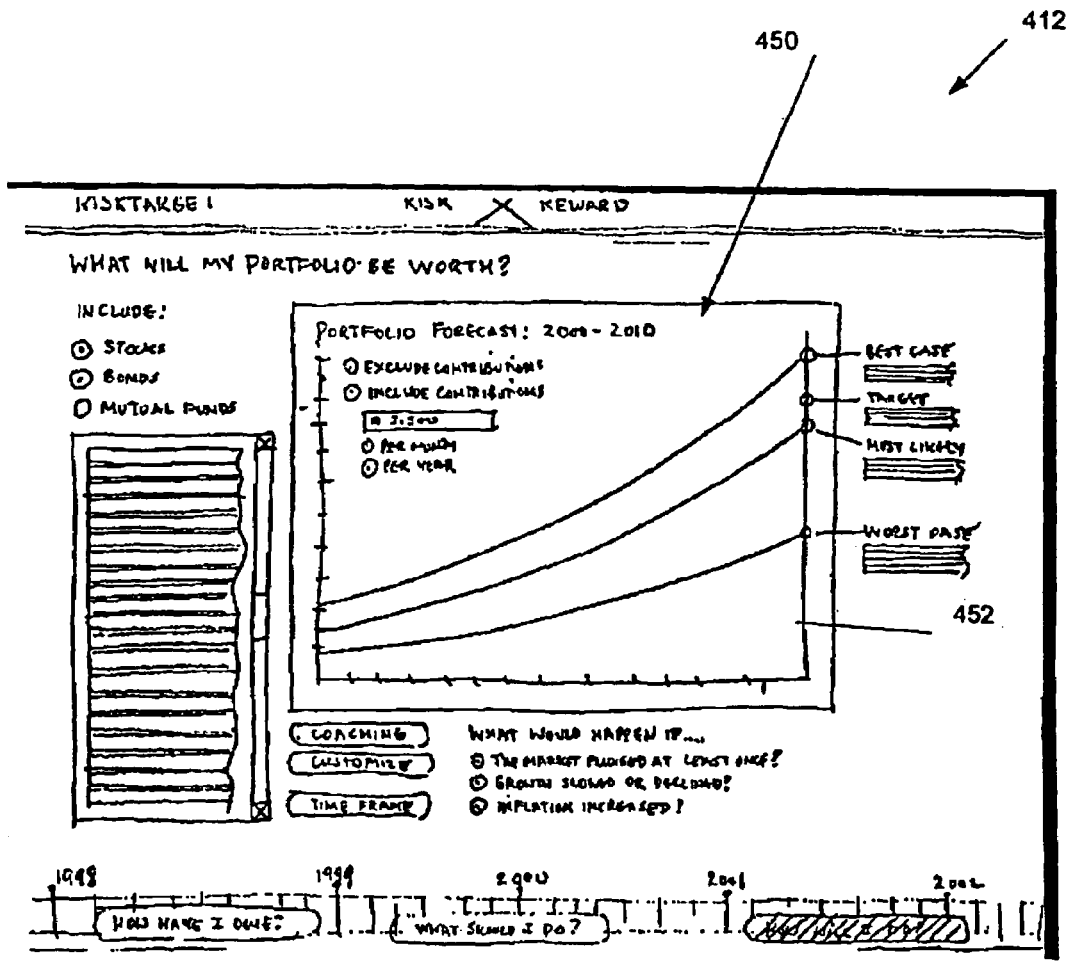
FIG. 16 is an illustration of a portfolio future performance projection graph web page interface.

FIG. 16 is yet another implementation of the graphical user interface 412. In this representation, the graphical window 450 displays a projection of the performance of the user's portfolio. The forecast and stress analysis of the user portfolio is generated by one of three method:
1—the future value is generated by projecting a current value forward using a compound growth factor.
2—another possible projection can be made by projecting a current value of the current position using volatility from a historical portfolio analysis.
3—also optionally, the forecast and stress analysis may be generated by applying compound growth factor and volatility using back-tested parameters to determine a future portfolio value.

Of course any forecast is based on assuming that underlying market conditions remain the same. In one embodiment of the present invention, algorithms such as the one by Algorithimcs' Mark-to-Future™ is used in calculations to test against detailed scenarios and regimes using Monte Carlo Simulation™.

The risk and return analysis is performed in the following manner:
The estimated start value of a portfolio at the beginning of a reporting cycle, the estimated end value and the compound growth factor for each period in the cycle are calculated by fitting a curve of the form $Y=AB^X$ to the time series, where:

Y=the portfolio value at time t
A=the estimated start value of the portfolio
B=1+the compound growth factor
X=the time period, t, where t=0 in the first period The curve is fitting by performing linear regression on X and the natural logarithm of Y:
  $LnY=LnA+X*LnB$ 95% confidence intervals, the risk measures, are calculated using the standard error of the predicted value of Ln Y The estimated end value of the portfolio is calculated using the regression formula where X=the number or periods in the reporting cycle, less 1.

Most investors do not understand the likelihood of reaching their investment goals, and what picks they should be making to increase their chances of success. Clients want to understand both historical performance and possible future performance in order to improve decision-making. The present invention can address both, with or without advisor support, allowing the business to meet the aggressive growth expectations the market values highly.

The present invention helps to build a common language, metrics and tools to quantify risk so that the investing public can proactively manage it. The present invention provides a rigorous process for managing personal portfolio risk.

Preferably, the present invention is available 24 hours a day, seven days a week and requires no human intervention. Moreover, the present invention can inform clients about risk using plain language and simple graphic representations. This broadens the target audience to include all investors.

The present invention is initiated by the client from the brokerage's Web site. However, many of the application components may reside on the client. The application may either be downloaded from the Web site or provided on a CD ROM. The client-side application of the present invention reaches out to the secure web site for required data feeds and possibly more complex computation. Historical customer data is stored on the client to avoid complex data storage issues on the server. Customers are offered a secure back-up capability to a third party's address. If a client wants to share information with their advisor, historical account information is automatically uploaded to the advisor with the client's permission.

A preferred embodiment of the present invention is written using JAVA™, C, and the C++ language and utilizes object oriented programming methodology. Any other Object Oriented Programming (OOP), may be used to implement the current invention. Moreover, the invention may be practiced with other computer systems configurations such as handheld devices, multiprocessor systems, microprocessor-based or programmable consumer electronics, network PC's, microcomputers, and mainframe computers. The invention also may be practiced in distributed computing environments where tasks are performed by remote processing devices that are linked through a communication network. In a distributed computing environment, computer programs may be located in both local and remote memory storage devices.

Although only a few embodiments of the present invention have been described in detail herein, it should be understood that the present invention might be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A method for providing remote web-based financial portfolio coaching, implemented via a computing device including at least one processor and memory, comprising:
receiving a selection of a service agreement from a user, via the computing device, wherein the selected service agreement is chosen from a plurality of different service agreements providing various service levels related to portfolio modeling and coaching, and wherein the various service levels define distinct combinations of support, financial models, portfolio modeling, and coaching services to the user;
identifying, by the computing device, a current financial portfolio of the user;
identifying, by the computing device, a financial model selected from a set of financial models defined by the selected service agreement, the financial model including a user profile based on personal financial parameters of the user including at least a risk tolerance level; and
providing to the user, via the computing device, customized financial coaching tailored to life intentions of the user, wherein the customized financial coaching includes suggestions for changes to the current financial portfolio based on the user profile and the selected service agreement, wherein the suggestions are presented in a natural language format, and wherein the suggestions include financial products and recommended securities for the user to purchase.

2. The method of claim 1, further including:
determining the personal financial parameters including a user investment style; and a user bull/bear market attitude.

3. The method of claim 1 wherein the risk tolerance level is determined by:
displaying, via the computing device, to the user a series of progressively more negative financial scenarios;
receiving from the user, via the computing device, responses to the series;
analyzing the received responses; and
generating the risk tolerance level based on the analysis.

4. The method of claim 2 wherein said user investment style is determined by:
displaying to the user a series of test scenarios via the computing device;
receiving user responses to the series of test scenarios via the computing device; and
generating said user investment style based on the received user responses.

5. The method of claim 2 wherein said user bull/bear attitude is determined by:
displaying to the user a series of user selected expert opinions via the computing device;
receiving user responses to the series of user selected expert opinions via the computing device;
analyzing the received user responses; and
generating said user bull/bear attitude based on the analysis.

6. The method of claim 1 further comprising:
filtering a list of securities based on the user profile to generate the recommended securities; and
presenting the recommended securities to the user for possible security swaps, wherein securities can be added to or removed from the current financial portfolio.

7. The method of claim 6 wherein filtering the list of securities comprises:
obtaining a Value At Risk (VAR) value and a Beta value for each security in the list of securities; and
rejecting securities in the list of securities not complying with the user profile based on the VAR values and the Beta values.

8. The method of claim 1, further including:
calculating a user VAR value and a user Beta value for the portfolio using a risk management model.

9. The method of claim 8 further comprising:
comparing the user VAR value and the user Beta value to a VAR value and a Beta value of various user selected market indices; and
displaying the result to the user in a graph via the computing device.

10. The method of claim 1, further including:
generating a compound growth factor using linear regression and natural logarithm.

11. The method of claim 10, further including:
projecting a future performance of the current financial portfolio using the compound growth factor.

12. The method of claim 6 further comprising:
allowing the user to select at least one security from the filtered list of securities;
swapping the selected securities with securities in the current financial portfolio;
analyzing the effect of said swapping on the current financial portfolio; and
displaying, via the computing device, the analysis.

13. The method of claim 6, further including:
displaying, via the computing device, the filtered list of securities in a first column and a second column, wherein securities with positive Beta values are displayed in the first column and securities with negative Beta values are displayed in the second column.

14. The method of claim 1, further including:
creating, by a financial model developer, an ideal portfolio based on the user profile.

15. The method of claim 1, further including:
providing, to the user, automated computer coaching and live coaching based on the selected service agreement.

16. A system for providing remote web-based financial portfolio coaching comprising:
at least one memory to store data and instructions; and
at least one processor configured to access the at least one memory and execute instructions to:
receive a selection, from a user, of a service agreement for the user, wherein the selected service agreement is chosen from a plurality of different service agreements providing various service levels related to portfolio modeling and coaching, and wherein the various service levels define distinct combinations of support, financial models, portfolio modeling, and coaching services to the user;
identify a current financial portfolio for the user;
generate, based upon a financial model selected from a set of financial models defined by the selected service agreement, a user profile based on personal financial parameters of the user, wherein the user profile includes at least a risk tolerance level;
providing, via an internet connection, automated financial coaching in a natural language format; and
providing, to the user, recommended changes to the current financial portfolio based on the user profile and the distinct combination of services defined by the selected service agreement, including providing customized financial coaching tailored to life intentions of the user and providing suggestions of financial products and recommended securities for the user to purchase.

17. The system of claim 16 wherein the profile is based on personal financial parameters of the user, and the personal financial parameters further include:
 a user investment style; and
 a user bull/bear market attitude.

18. The system of claim 16, wherein the at least one processor is further configured to:
 display to the user a series of progressively more negative scenarios;
 receive responses to the series;
 analyze the received responses; and
 generate the risk tolerance level based on the analysis.

19. The system of claim 17, wherein the at least one processor is further configured to:
 determine the user's investment style by displaying to the user a series of test scenarios; and
 generate said user investment style based on the user responses to these test scenarios.

20. The system of claim 17, wherein the at least one processor is further configured to determine the user's bull/bear attitude by:
 displaying a series of user selected expert opinions;
 analyzing the user's response to the opinion; and
 generating said user bull/bear attitude based on the user responses.

21. The system of claim 16, wherein the at least one processor is further configured to:
 filter a list of securities based on the user profile to generate recommended securities; and
 present the recommended securities to the user for swapping.

22. The system of claim 21, wherein the at least one processor is further configured to:
 calculate a Value At Risk (VAR) value and a Beta value for each security in the list of securities; and
 reject securities in the list of securities not complying with the user profile based on the VAR values and the Beta values.

23. The system of claim 16, wherein the at least one processor is further configured to:
 calculate, using a risk management tool, a user VAR value and a user Beta value; and
 graphically compare the user VAR value and the user Beta value of the portfolio to a VAR value and a Beta value of user selected market indices.

24. The system of claim 16, wherein the at least one processor is further configured to:
 estimate a compound growth factor using linear regression time period natural logarithm.

25. The system of claim 24, wherein the at least one processor is further configured to:
 project a future performance of the portfolio based on the compound growth factor.

26. The system of claim 21, wherein the at least one processor is further configured to:
 allow the user to select at least one security from the filtered list of securities;
 swap the selected securities with securities in the current financial portfolio; and
 analyze an effect of the swapping on the current financial portfolio.

27. The system of claim 21, wherein the at least one processor is further configured to:
 display the filtered list of securities in a first column and a second column, wherein securities with positive Beta values are displayed in the first column and securities with negative Beta values are displayed in the second column.

28. The system of claim 16, wherein the at least one processor is further configured to:
 create an ideal portfolio based on the user profile.

29. The system of claim 16, wherein the at least one processor is further configured to:
 provide, to the user, access to computer coaching and live financial advising based on the selected service agreement.

30. A computer program embodied on a computer readable medium for providing web-based financial portfolio coaching remotely over an internet connection, wherein the computer program is configured to perform a method comprising:
 receiving a selection of a service agreement from a user, wherein the selected service agreement is chosen from a plurality of different service agreements providing various service levels related to portfolio modeling and coaching, and wherein the various service levels define distinct combinations of support financial models, portfolio modeling, and coaching services to the user;
 identifying a current financial portfolio of the user;
 identifying a financial model from a set of financial models defined by the selected service agreement, the financial model including a user profile based on personal financial parameters of the user, the personal financial parameters including at least a risk tolerance level; and
 providing to the user customized financial coaching tailored to life intentions of the user, wherein the customized financial coaching includes suggestions for changes to the current financial portfolio based on the user profile and the selected service agreement, wherein the suggestions are presented in a natural language format, and wherein the suggestions include financial products and recommended securities for the user to purchase.

31. The computer program of claim 30, wherein the method further includes:
 calculating a user's personal financial parameters wherein the personal financial parameters include a user investment style, and a user bull/bear attitude.

32. The computer program of claim 30 wherein the method determines the risk tolerance level by:
 displaying to the user a series of progressively more negative financial scenarios;
 receiving responses to the series;
 analyzing the received responses; and
 generating the risk tolerance level based on the analysis.

33. The computer program of claim 31 wherein the method determines the user investment style by:
 displaying to the user a series of test scenarios;
 receiving responses to the series of test scenarios; and
 generating said user investment style based on the received responses.

34. The computer program of claim 31 wherein the method determines the user bull/bear attitude by:
 displaying a series of user selected expert opinions;
 receiving user responses to the series of user selected expert opinions;
 analyzing the received user responses; and
 generating said user bull/bear attitude based on the analysis.

35. The computer program of claim 30 wherein the method further includes:
 filtering a list of securities based on the user profile to generate the recommended securities; and presenting the recommended securities to the user for possible security swaps.

36. The computer program of claim 35 wherein filtering securities further comprises:
   obtaining a Value At Risk (VAR) value and a Beta value for each security in the list of securities; and
   rejecting securities in the list of securities not complying with the user profile based on the VAR value and the Beta value.

37. The computer program of claim 30 wherein the method further includes:
   calculating a user VAR value and a user Beta value for the current financial portfolio.

38. The computer program of claim 37, wherein the method further includes:
   comparing the user VAR value and the user Beta value to a VAR value and a Beta value of various user selected market indices to generate at least one result; and
   displaying the at least one result to the user via a graph.

39. The computer program of claim 35 wherein the method further includes:
   allowing the user to select at least one security from the filtered list of securities;
   swapping the selected securities with securities in the current financial portfolio;
   analyzing the effect of said swapping on the current financial portfolio; and
   displaying the effect to the user via a display device.

40. The computer program of claim 35 wherein the method further includes:
   displaying the filtered securities in a first column and a second column, wherein securities with positive Beta values are displayed in the first column and securities with negative Beta values are displayed in the second column.

41. The computer program of claim 30 wherein the method further includes:
   creating, via a financial portfolio model, an ideal user portfolio based on the user profile.

42. The computer program of claim 30 wherein the method further includes:
   providing the user with automated computer coaching and live coaching based on the selected service agreement.

* * * * *